(12) United States Patent
Kitada

(10) Patent No.: US 7,261,822 B2
(45) Date of Patent: *Aug. 28, 2007

(54) METHOD AND APPARATUS FOR ACTIVATING WATER

(75) Inventor: Masayoshi Kitada, Wako (JP)

(73) Assignee: Honda Giken Kogyo Kabushiki Kaisha, Minato-ku (JP)

( * ) Notice: Subject to any disclaimer, the term of this patent is extended or adjusted under 35 U.S.C. 154(b) by 18 days.

This patent is subject to a terminal disclaimer.

(21) Appl. No.: 10/499,998

(22) PCT Filed: Jan. 23, 2003

(86) PCT No.: PCT/JP03/00591

§ 371 (c)(1),
(2), (4) Date: Jun. 23, 2004

(87) PCT Pub. No.: WO03/064332

PCT Pub. Date: Aug. 7, 2003

(65) Prior Publication Data

US 2005/0006592 A1    Jan. 13, 2005

(30) Foreign Application Priority Data

Jan. 29, 2002    (JP)    ............................. 2002-020440

(51) Int. Cl.
*C02F 1/30*    (2006.01)
(52) U.S. Cl. ...................................... 210/748; 210/763
(58) Field of Classification Search ................ 210/748, 210/695, 758, 763; 261/94–98, DIG. 72; 204/157.15, 157.5
See application file for complete search history.

(56) References Cited

U.S. PATENT DOCUMENTS

| | | | |
|---|---|---|---|
| 2,631,921 A * | 3/1953 | Odell | ......................... 423/659 |
| 3,900,429 A | 8/1975 | Komatsu et al. | |
| 4,563,286 A * | 1/1986 | Johnson et al. | ............. 210/721 |
| 4,904,381 A * | 2/1990 | Urakami | ..................... 210/223 |
| 6,361,660 B1 * | 3/2002 | Goldstein | ............. 204/157.15 |
| 6,361,810 B1 * | 3/2002 | Korsch | ........................ 426/66 |
| 6,602,411 B1 * | 8/2003 | Aida et al. | .................. 210/222 |
| 6,638,434 B2 * | 10/2003 | Otsuki | ........................ 210/748 |

(Continued)

FOREIGN PATENT DOCUMENTS

JP    64-27642    1/1989

(Continued)

OTHER PUBLICATIONS

International Search Report for International Application No. PCT/JP02/00642 dated Mar. 12, 2002.

*Primary Examiner*—Matthew O. Savage
(74) *Attorney, Agent, or Firm*—Hamre, Schumann, Mueller & Larson, P.C.

(57) ABSTRACT

A process of activating water by leading water to pass through energy concentrated fields which are generated in particles, being composed of a single elementary material selected from a group of silicon, titanium, nickel and samarium or composed of fluorocarbon, of which the single elementary material or the fluorocarbon is placed at a position where wave energy intrinsic to each atom or said fluorocarbon is amplified and constructing activation structural bodies are concurrently carried out with increasing quantity of dissolved oxygen in the water. Water can be activated without externally supplying energy or with a little energy.

13 Claims, 21 Drawing Sheets

U.S. PATENT DOCUMENTS

2004/0076563 A1* 4/2004 Kitada .................. 422/211

FOREIGN PATENT DOCUMENTS

| | | |
|---|---|---|
| JP | 01-179701 | 7/1989 |
| JP | 4-59601 | 2/1992 |
| JP | 6-142659 | 5/1994 |
| JP | 6-287091 | 10/1994 |
| JP | 7-24739 | 1/1995 |
| JP | 8-172022 | 7/1996 |
| JP | 9-296364 | 11/1997 |
| JP | 10-122067 | 5/1998 |
| JP | 10-328679 | 12/1998 |
| JP | 11-79701 | 3/1999 |
| JP | 11-123325 | 5/1999 |
| JP | 11-151486 | 6/1999 |
| JP | 11-216365 | 8/1999 |
| JP | 11-290858 | 10/1999 |
| JP | 2000-53401 | 2/2000 |
| JP | 2000-296393 | 10/2000 |
| JP | 2001-026482 | 1/2001 |
| JP | 2001-058191 | 3/2001 |
| JP | 2001-314878 | 11/2001 |

* cited by examiner

FIG.1
(a)
(b)
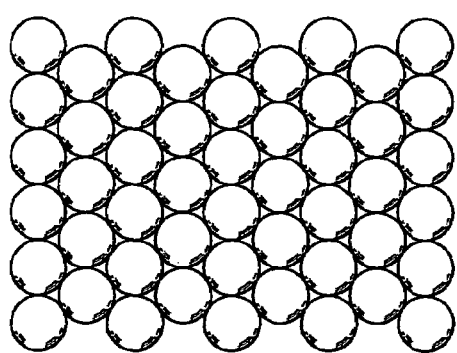
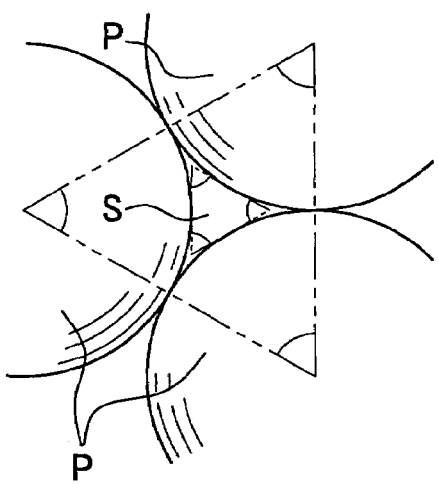
(c)
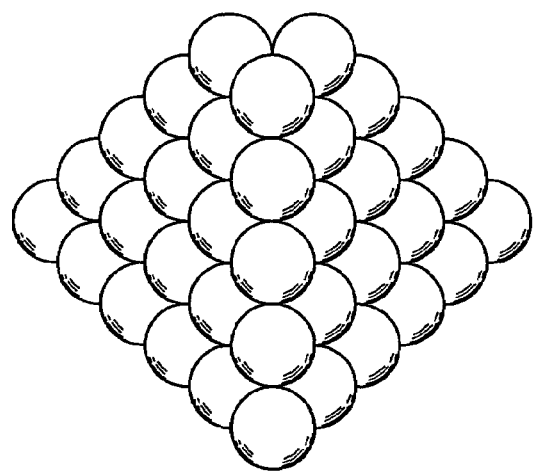
(d)
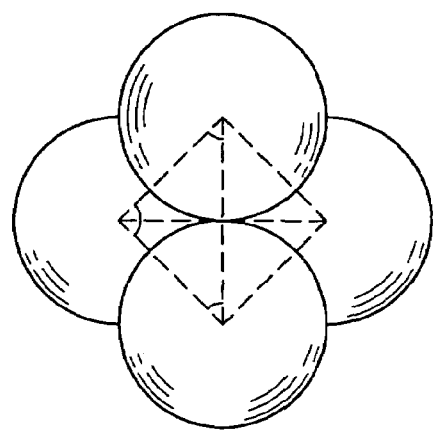

FIG.2
(a) Present Invention
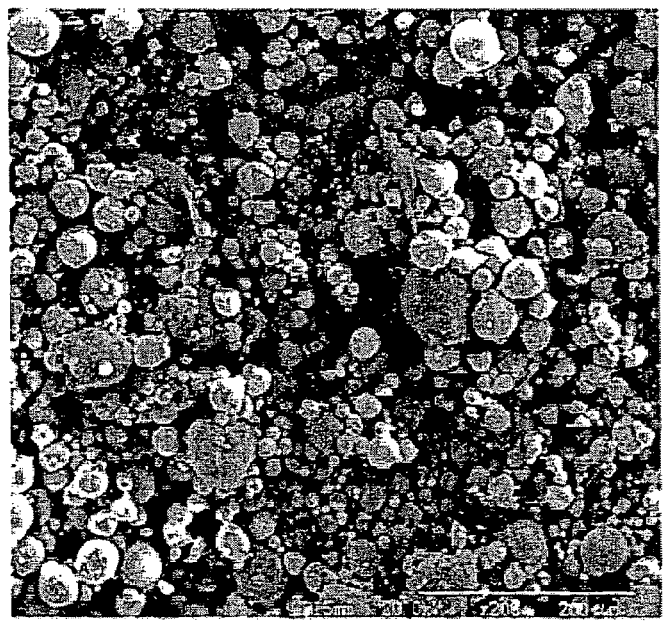
(b) Example of Comparison
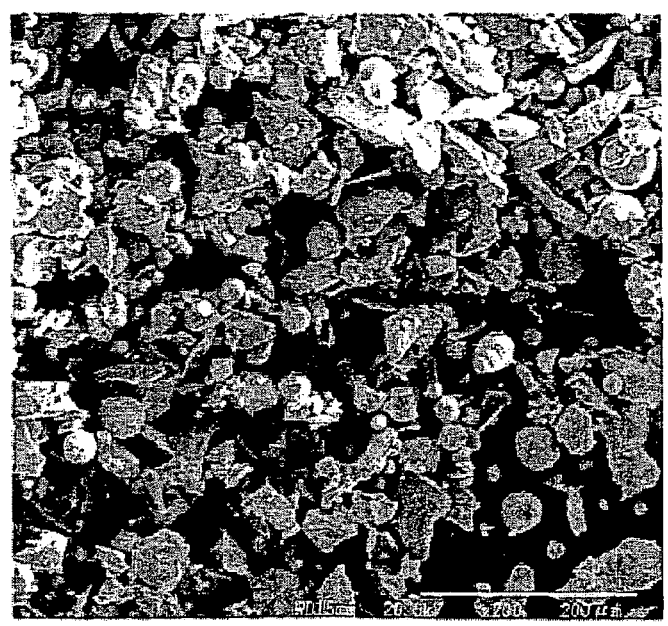

FIG.3
(a)
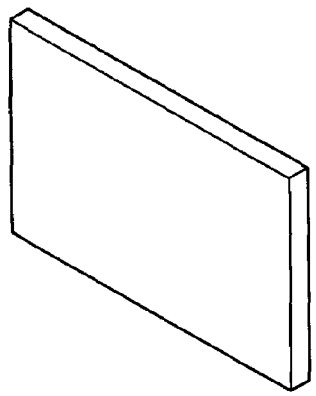
(b)
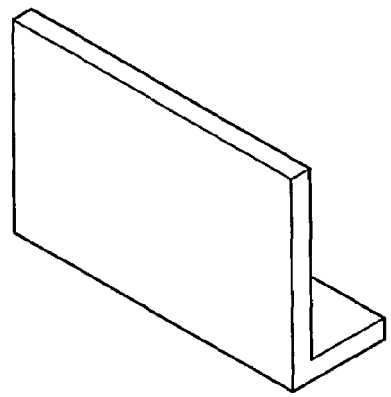
(c)
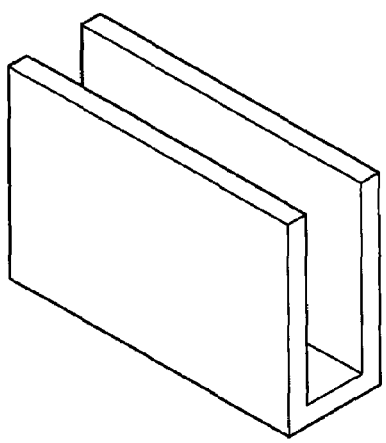
(d)
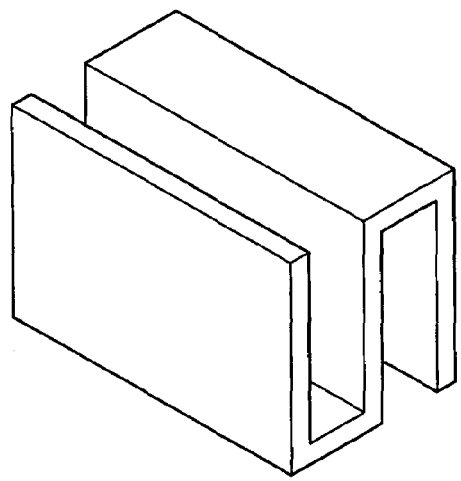

FIG.4
(a)
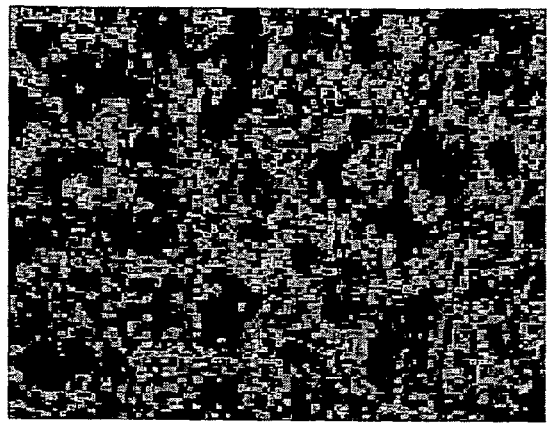
(b)
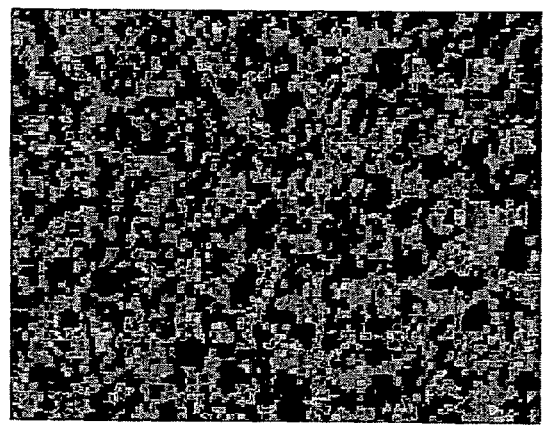
(c)
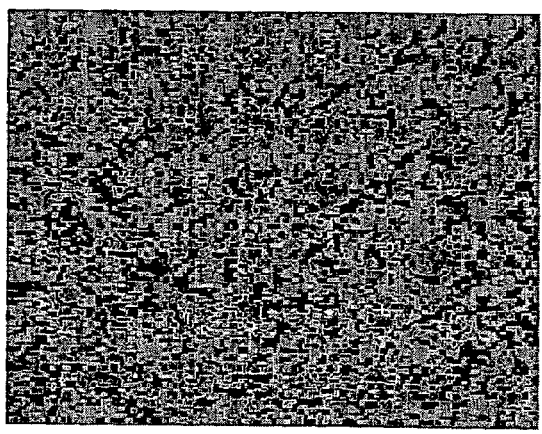

FIG.5
(a)
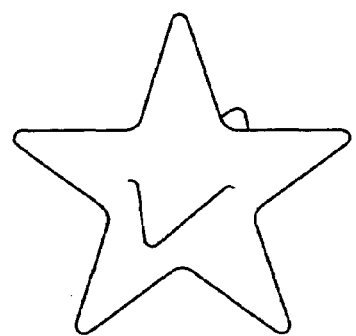
(b)
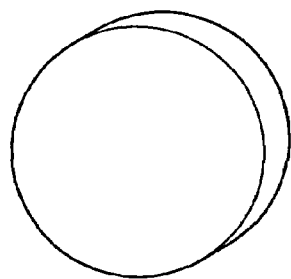
(c)
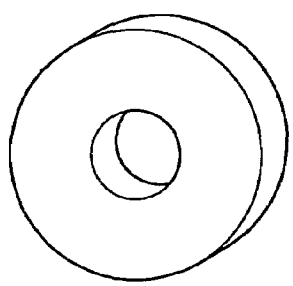
(d)
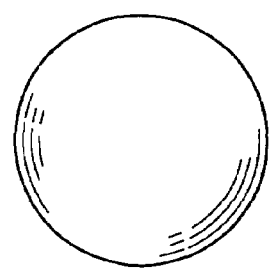
(e)
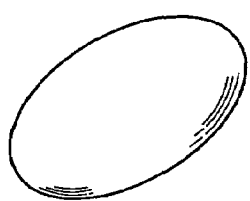
(f)
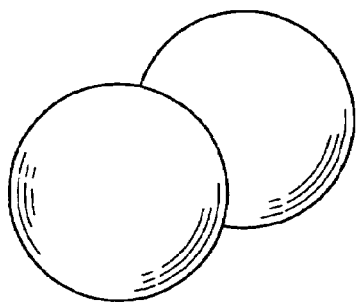
(g)
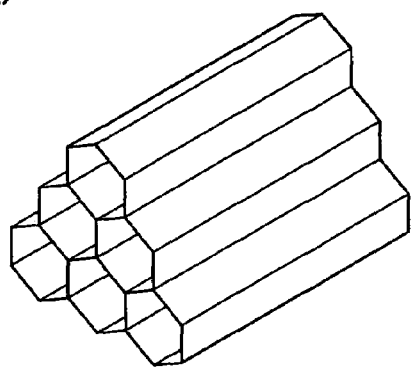

FIG.6
(a) 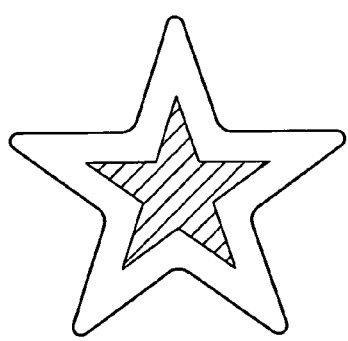
(b) 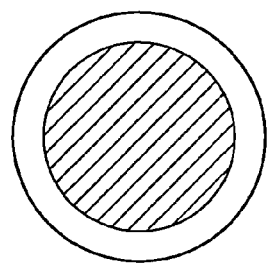
(c) 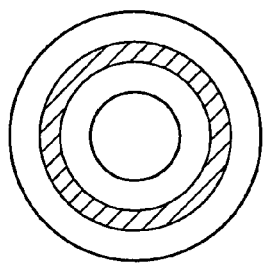
(d) 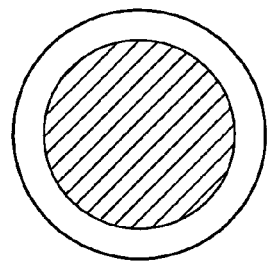
(e) 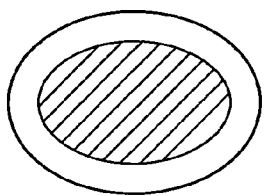
(f) 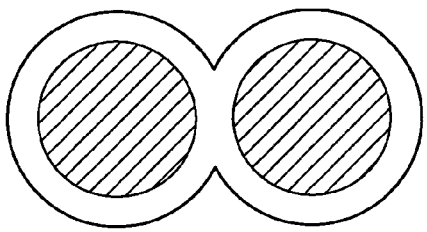

FIG.8
(a)
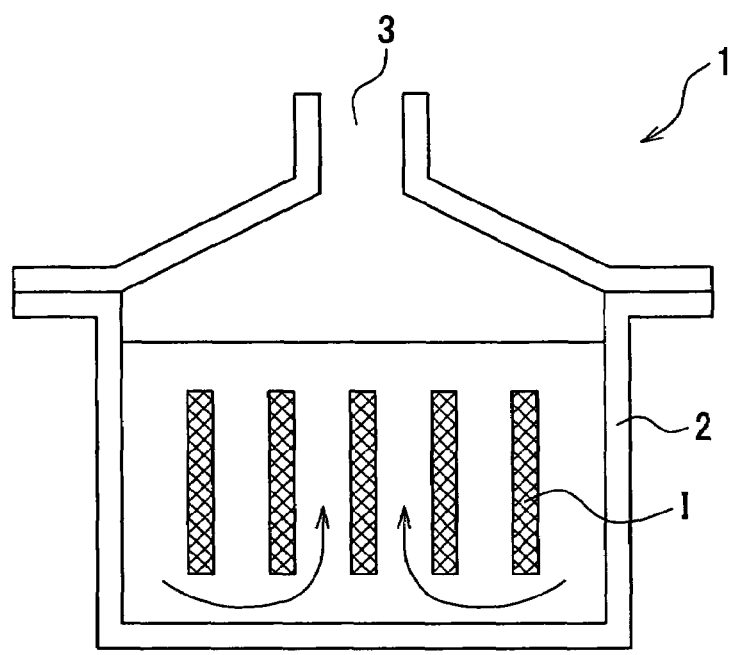
(b)
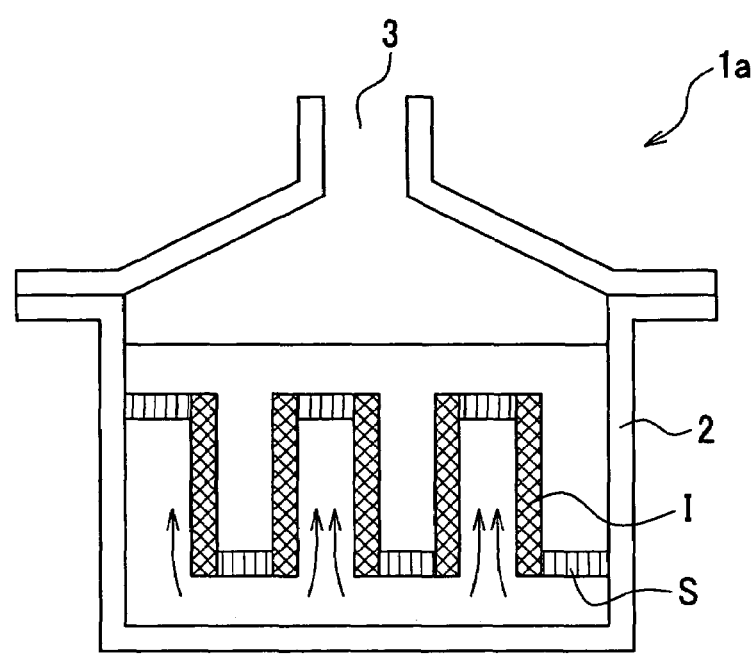

FIG.10
(a)
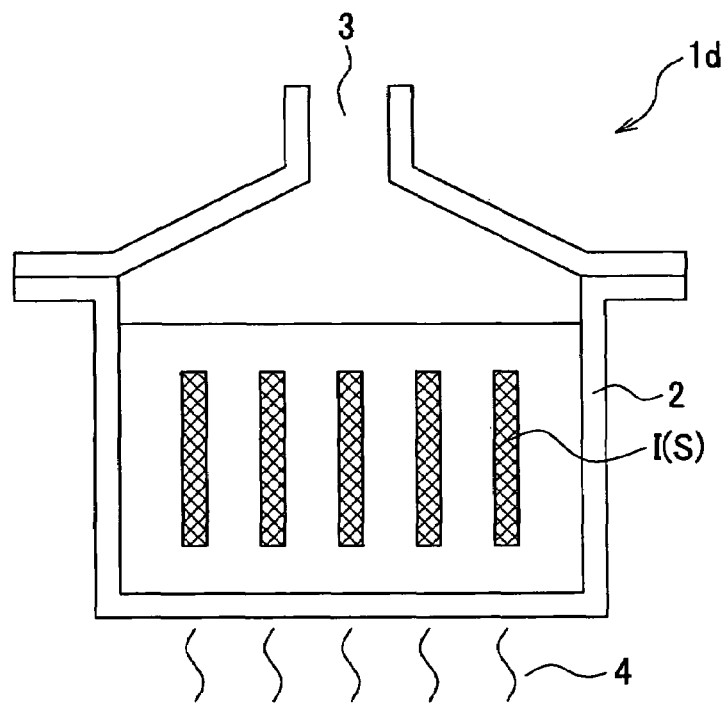
(b)
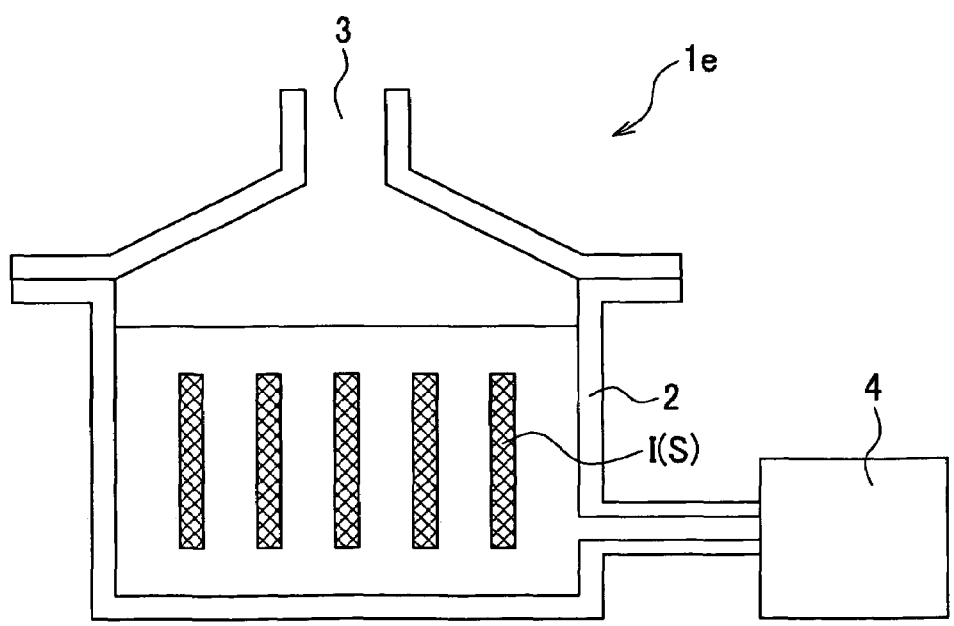

FIG.11
(a)
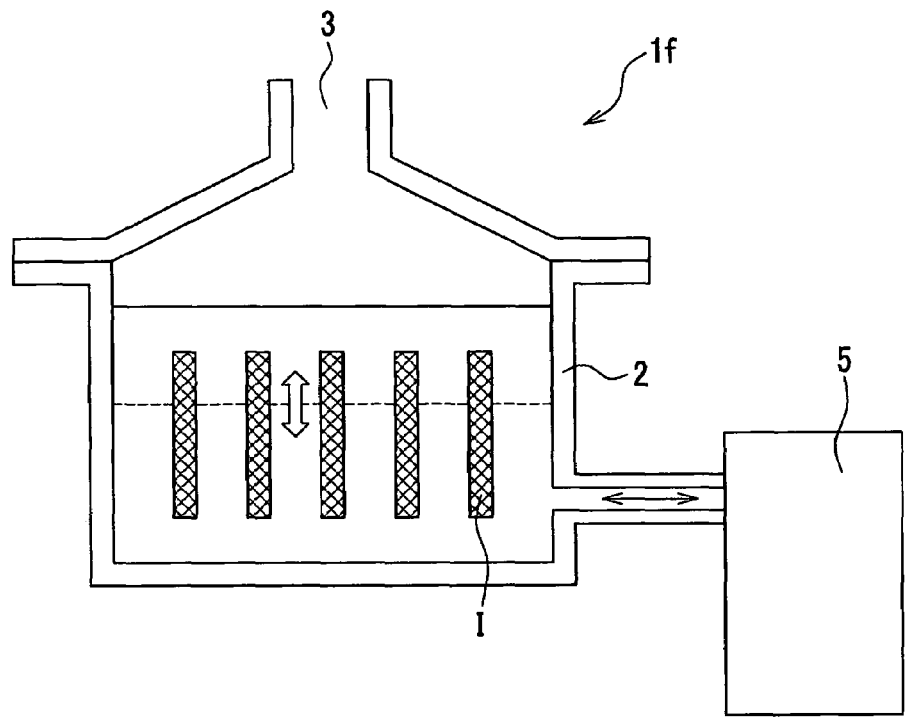
(b)
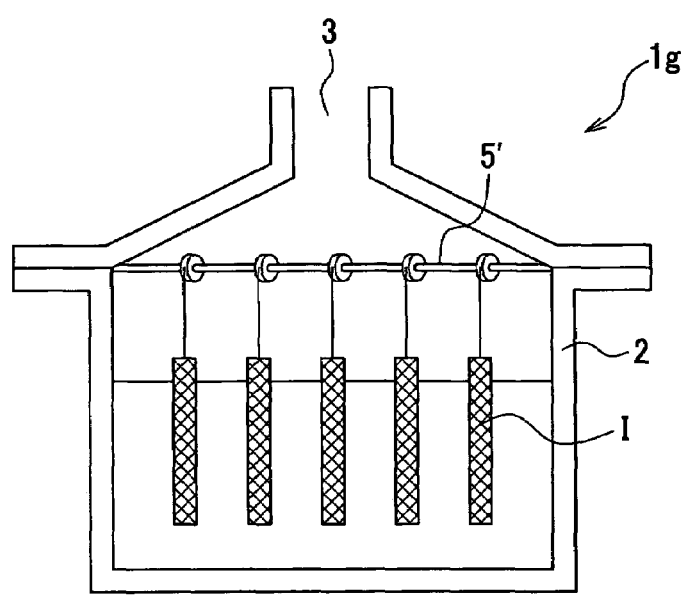

FIG.13
(a)
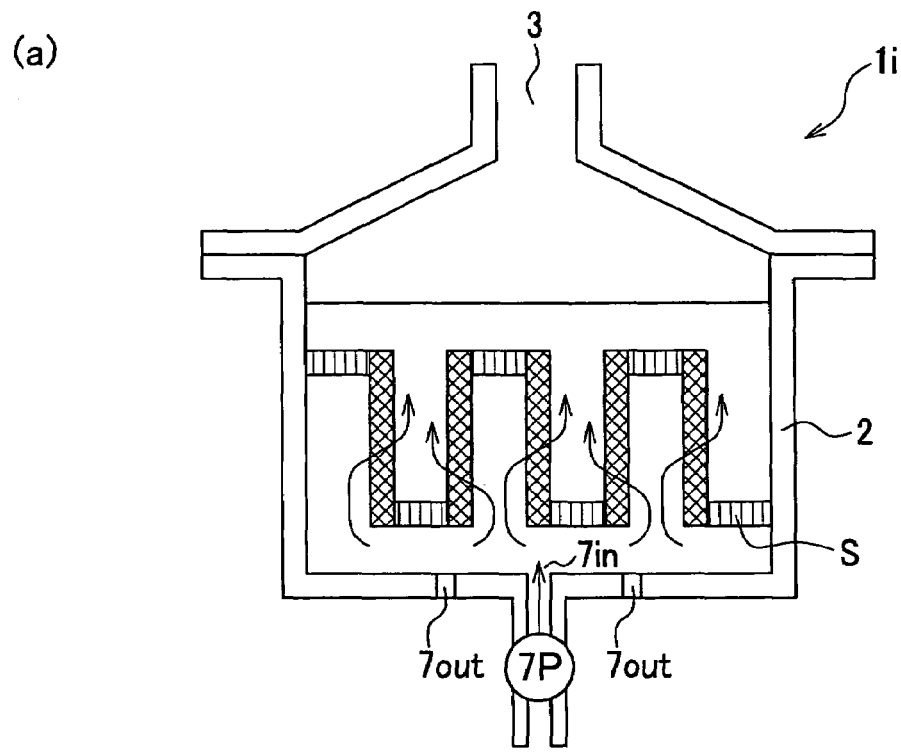
(b)
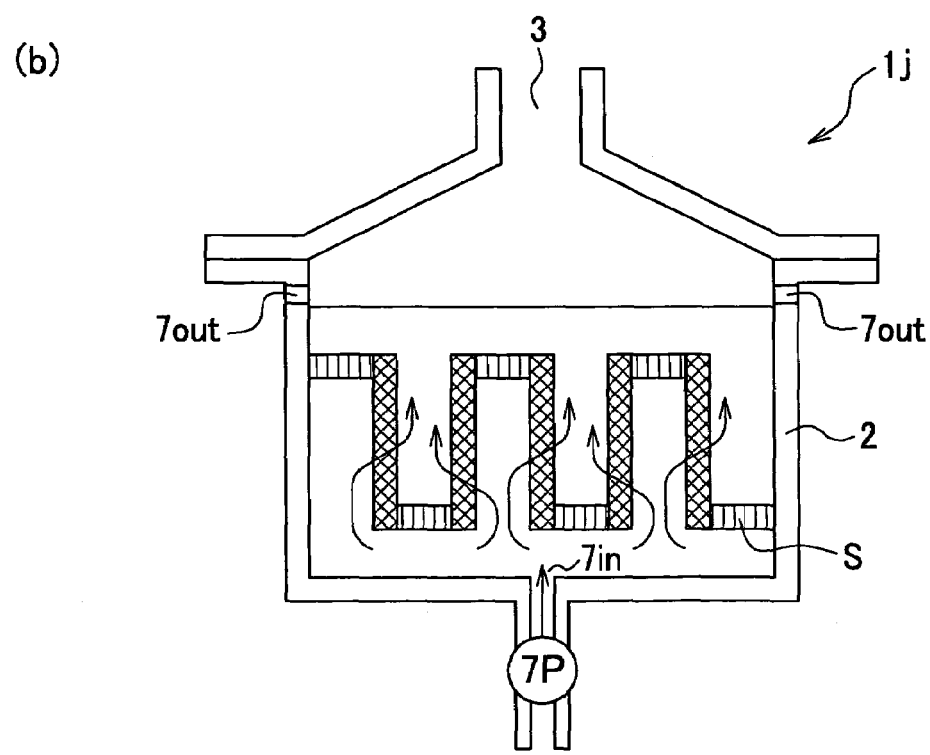

FIG.19
(Prior Art)
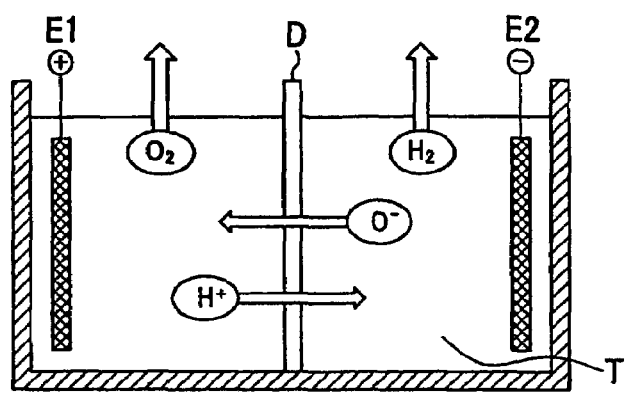
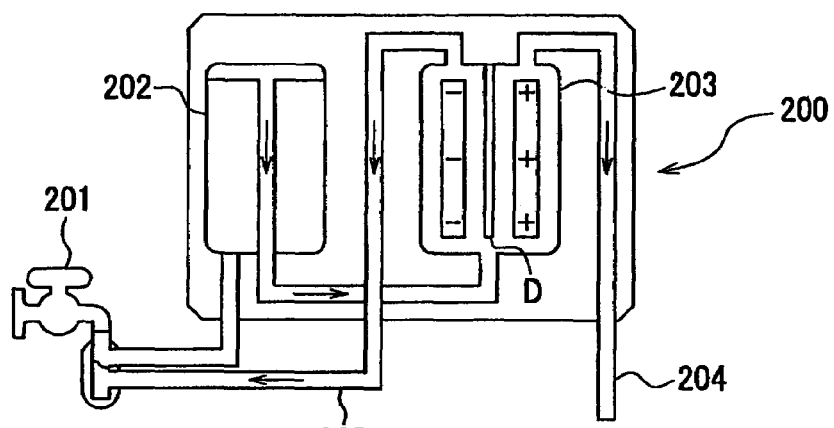
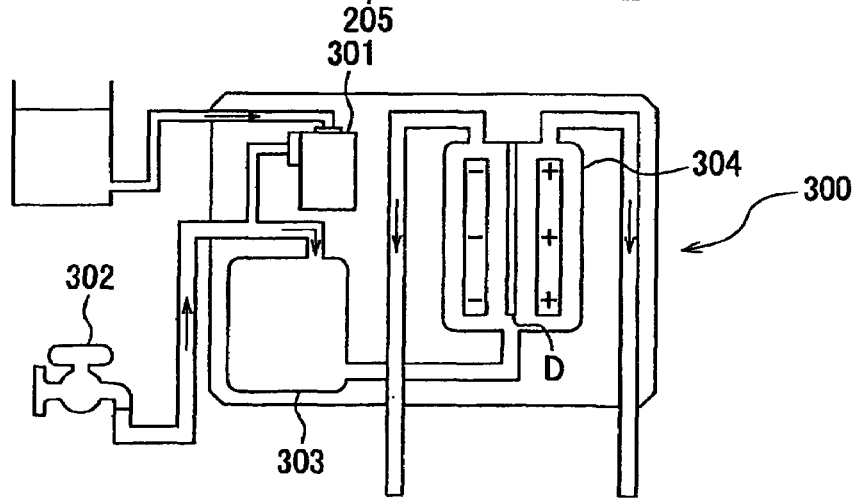

FIG.21
(a) 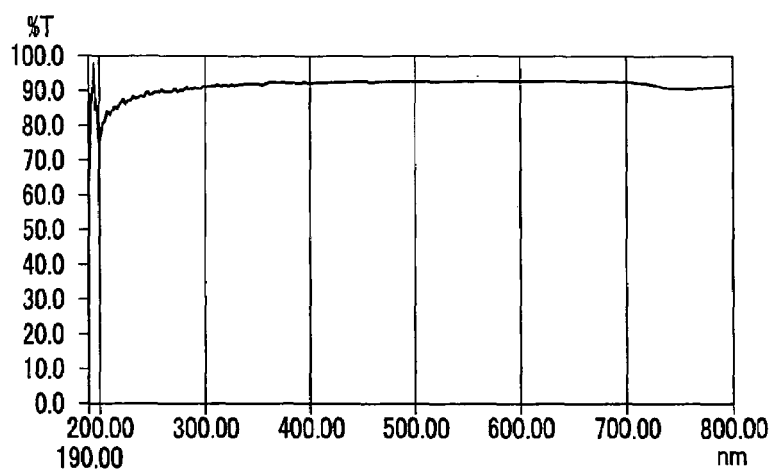
(b) 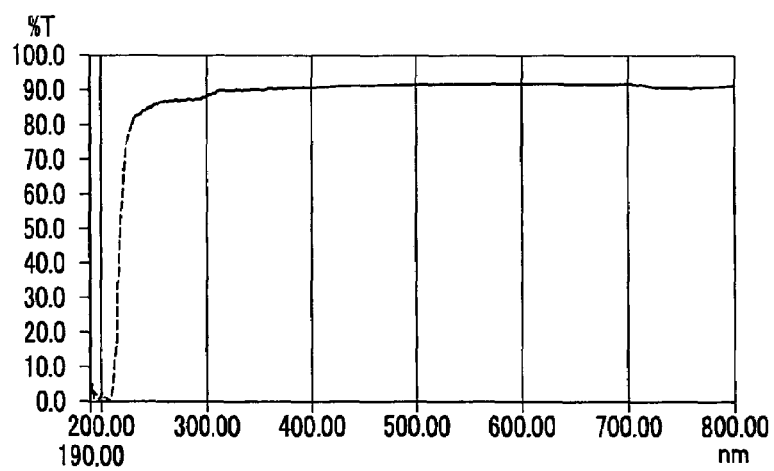
(c) 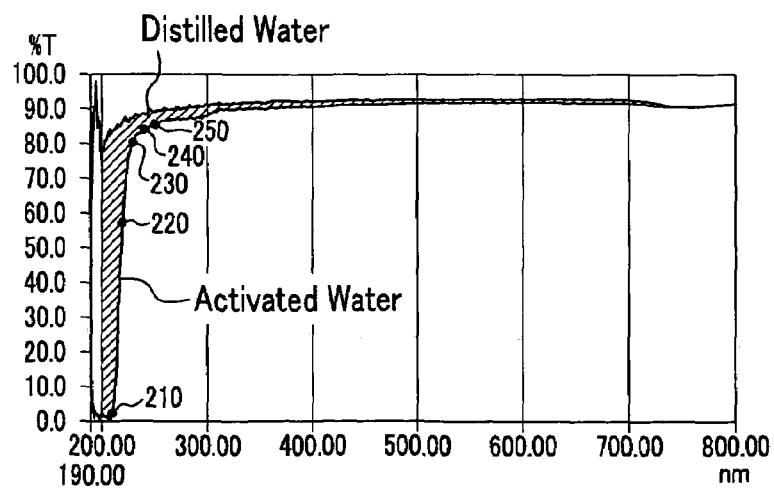

METHOD AND APPARATUS FOR ACTIVATING WATER

TECHNICAL FIELD

The present invention relates to a method and an apparatus for water activation. Explaining in further details, the invention provides a method and an apparatus for the activation wherein energy concentrated fields among particles which are composed of specific atoms are generated and the water which passes through or stays in the energy concentrated fields is activated.

BACKGROUND ART

Water activation has been recently used in the pharmaceutical field, the cosmetic field, the industrial field, the food industrial field, the agriculture field and the homeware application field.

The electrolytic water is prepared by processing tap water in an electrolysis process wherein an apparatus shown in FIG. 19(a), for example, is used. The tap water is electrolytic water including calcium, magnesium, sodium, potassium etc. as in chemical compounds of metal salts.

By using a diaphragm D, the tank T is separated into two cells where an anode E1 and a cathode E2 are placed as shown in FIG. 19 (a). By applying the predetermined current to two electrodes E1 and E2, the electrolytic water is produced.

At the anode E1, the water molecule is decomposed into H++ (hydrogen ion), $O_2$ (oxygen molecule) and $e^-$ (electron) and therefore the hydrogen ion increases and the oxygen molecule dissolves into water up to the saturation limit which is determined by the water temperature. In this case, ozone, $O_2$ radicals and oxidizing ions that have oxidation effects are generated. If the electrolytes such as sodium chlorides are presented in the water, the materials derived from the electrolytes are produced, wherein acid water is produced at the anode. Therefore, acid water is prepared at the anode.

On the other hand, OH— (hydroxide) increases by a reaction of electron ($e^-$) and H2 (hydrogen molecule), and is dissolved into water. The water at the cathode E2 features that the inclusion of the material, such as oxygen which relates to the oxidation, extremely decreases. Alkali metals may be presented in water, where some portion of the alkali metals such as calcium, magnesium, sodium, potassium is attracted to the cathode E2. Therefore, it is the feature of the cathode E2 that the ions of these alkali metals dissolve in the water at the cathode E2.

The alkali metal ions dissolved in the water close to the cathode E2 keeps high digestive property in comparison to the corresponding salts (originally presented in the tap water) such as sodium chloride and calcium carbonate.

The apparatus that produces the electrolytic water are classified into two kinds: "an alkali ion water producer" (see FIG. 19 (b)) that electrolyzes tap water, pure water and mineral water etc. as they are, and "a strong oxidizing water producer" (see FIG. 19 (c)) that electrolyzes the electrolytic water such as the water including sodium chloride and calcium chloride.

Alkali ion water is obtained from the electrolyzed water at the cathode wherein the water is the tap water purified through the water purifier as shown in FIG. 19 (b).

The water supplied by tap water 201 is sent to the water purifier 202 and the mold-malodorant, trihalomethane etc. are removed (pre-treatment). The pre-treated water is sent to an electrolytic tank 203 which is constructed with the electrodes E1 and E2 and a diaphragm D. The water sent to the electrolytic tank 203 is electrolyzed, and two kinds of water are prepared which are deviated in the pH; one is the oxidizing ion rich water and the other the reducing ion rich water close to the anode E1 and the cathode E2, respectively.

These two kinds of water flow into two different flow paths (a main supply hose 204 and a drain hose 205). The alkali ion water from the cathode cell goes to the alkali ion water faucet attached to the water tap through the supply hose 204. The acid water from the anode cell is sent and drained, for example, into a kitchen sink.

It is told that the alkali ion water prepared in this process can be used for various purposes. To begin with, the applications may be home cooking and home use as follows.

1. Rice Steaming

It is believed that the alkali ion water is preferable for boiling vegetables. The steamed surface of the rice grain becomes lustrous. The taste is not degraded after the steamed rice is cooled down. Therefore, it is said such steamed rice using alkali ion water is suitable for rice balls and cool lunches.

2. Heat Cooking

The alkali ion water is preferred to be used for heat cooking of vegetables. For example, the root vegetables are boiled or steamed with the alkali ion water, then they are cooked well, while still maintaining the outer shapes. The boiling water is drained out and recovered, so that clear vegetable soup is obtained. Therefore the alkali ion water is said to be suitable for cooking soup, curry, stew and vegetable chowder.

3. Soaking

The alkali ion water is said to be effective for soaking dried foods and peas. The peas can, for example, be boiled in about ⅔ the time that is necessary for boiling them in tap water. Another example is dried mushrooms, which can be soaked in water in as little as 10 to 20 minutes.

4. Removing Harshness

The alkali ion water is said to be effective for use in removing harshness from vegetables. For examples, burdocks, eggplants, lotus roots, udo plants and butterburs can be shortly processed for removing harshness by soaking in water after cutting into suitable pieces. It is said that spinach can be boiled to remove harshness enough in a clear color.

5. Preparing Stock

When the stock of dried sea weeds, dried bonitos or dried sardines is prepared, the alkali ion water is said to make thicker but clearer soup in comparison to using tap water.

6. Making Tea and Coffee

Since the alkali ion water has the characteristic of high extraction, it is preferred to use the alkali ion water to maintain good taste when a half quantity of tea or coffee is consumed in comparison to when a normal quantity is consumed.

7. Diluting Alcohol Drinking

The alkali ion water is said to be preferably used to dilute an alcoholic beverage (in other words, prepare whisky-and-water). Since the alkali ion water is quickly digested in the stomach or bowel, a whisky-and-water, prepared using alkali ion water, is felt to be less heavy in the stomach in comparison to using mineral water or tap water for the dilution.

8. Removing Activated Oxygen

The detailed reasons have not been clarified, but there is a lot of experimental data that activated oxygen can be removed by constantly drinking alkali ion water.

However, the known electrolytic apparatus to prepare the electrolytic water has problems that the apparatus consumes a lot of electric power and the apparatus is complicated.

On the other hand the strong acid water is produced from the water in the anode cell by electrolyzing the tap water into which salt is put. For example, the production is done by the apparatus as shown in FIG. 19 (c). The strong acid water production apparatus 300 has no purifier but a measuring and adding apparatus 301 that measures and adds the electrolyte such as sodium chloride (NaCl).

In the industrial direct-water-supply type strong acid production apparatus 300, for example, the predetermined quantity of the electrolyte is measured and added to the water from water tap 302. The water to which a predetermined quantity of the electrolyte is measured and added (for example sodium chloride) is sent to a mixer 303 wherein the electrolytic water is agitated and made homogenous.

Then the electrolytic water is sent to the electrolytic tank 304 (see the details of the electrolytic tank 304 in FIG. 19 (a)).

The aqua electrolytic media in the electrolytic tank 304 produces the chloride compounds in a target quantity and is electrolyzed under a control to maintain constant pH and the oxidation-reduction potential (ORP).

In addition, the strong acid water production apparatus, such as for home use and portable use, has a tank shape type as is and a diaphragm and electrodes are included therein. No measuring and adding apparatus 301 or mixer 303 is used. The electrolytic process is done after the users prepare the electrolytic water and put the prepared electrolytic water into the electrolytic tank.

It is said that the strong acid water prepared in the above process can be effective, for example, for the use of bactericiding, pasteurizing, sterilizing. The bacteria dic by exposing to the strong acid water for a period of time longer than 30 seconds if the bacteria has weak drug resistance and for 2 minutes even if the bacteria has strong drug resistance.

However, the preparation such that the electrolytic water is prepared by using strong acid water production apparatus 300, and there is a problem that a large amount of electric power is consumed in electrolyzing water and the apparatus is complex.

Water magnetization and electromagnetic processes have been used for the purpose of water activation by means of refining cluster of water. The water molecule is made of two hydrogen atoms and an oxygen atom as H2O. However a plurality of water molecules (H2O) are combined into a cluster through the hydrogen bonding of two adjacent hydrogen atoms. In other words, the presence of water is not in a scheme of a single water molecule but in a large block such that the water molecules are linked through the hydrogen bonding (the block is called a cluster; a cluster of tap water is composed of 30 to 50 water molecules).

The electromagnetic waves or far infrared lights are applied to the water that is formed in a cluster including many water molecules combined by hydrogen bonding and the hydrogen bonding is de-combined into small clusters of water by the resonance.

The smaller the block of water molecules, in other words, the smaller the cluster of water, then the larger the enthalpy of the water, or in other words, resulting in more water activation. Because the energy to bond the block of water molecules into a cluster is small when the cluster size is small and therefore the block of water molecules is easy to move. A small cluster of water provides the following general effects;
1. Effects to reduce electrical conductivity
2. Effects to concentrate and subside micro particles forming a colloidal suspension (therefore suppressing the colloidal suspension and increasing the clearness of water)
3. Effect to suppress outbreak of algae
4. Effect to increase the dissolved oxygen
5. Effect to suppress the generation of rust and scale
6. Effect to accelerate the growths of water creatures as fish and waterweeds According to these point of views, a magnetization apparatus as shown in FIG. 20 has been developed.

This apparatus 400 has a main body including an inlet 402 of the water-in and an outlet 403 of the water-out and a strong magnet filled with neodymium, cobalt, niobium etc. as activated materials.

The water H2O (large) which is led from the water tap to the inlet 402 has a large cluster. The cluster is de-combined into small clustered water H2O (small) by an MHD reaction (Magnet Hydro Reaction) of strong magnetization metals and the cluster of water becomes small and the water may be drained out from the outlet 403.

By using this apparatus, it is possible to de-combine a cluster into smaller clusters without outer energy supply.

However, the effect to de-combine the cluster of water by activating this strong magnetic metal is not sufficient and there is a strong requirement to further de-combine the clusters.

Moreover, this apparatus makes a strong magnetic contact between the water and the metal. However direct contact of the metals to the water generates oxide metals and metal chlorides by reaction with the oxygen and salts dissolved in the water. Then there is a problem that the oxide metals and metal chlorides are dissolved into water.

Furthermore, another problem is that these metals are expensive and the apparatus becomes expensive as well.

The reference (Japanese Published Patent Application 2001-220306) describes the invention that uses predetermined photosynthetic bacteria introduced into the water to be processed and that increases the dissolved oxygen.

The introduction of the predetermined photosynthetic bacteria can activate the water creatures and reduce BOD/COD of water as well as remove anaerobic bacteria presented in the water.

However, the activation of such bacteria depends on the ambient temperature and the exposure to the sun shine and is not stable. Therefore, a stable apparatus to produce activated water is difficult as far as using such bacteria. Also the application of the apparatus is limited due to the use of bacteria.

Therefore the object of the present invention is to provide water activation method and water activation apparatus that activate water without supplying external energy or with supplying little external energy.

The present inventor has already filed a patent application (Japanese Patent Application; 2001-0271734) that allows the activation of materials by high energy which is generated between particles once the particles composed of the predetermined metals are formed into an arrangement of the predetermined alignment.

According to this invention, particles composed of a single elementary material selected from a group of silicon, titanium, nickel and samarium or fluorocarbon are placed at a position where the wave energy intrinsic to each atom or the fluorocarbon is amplified, and the activation structural body, that has a field of concentrated energy, generates high energy. In other words, the invention describes that it is possible to activate various materials which pass by and stay in the field of the concentrated energy.

DISCLOSURE OF INVENTION

The present invention has been provided on the basis of such knowledge and findings, and the invention has been completed by such a finding that a water activation apparatus, which is configured in such a structure that the activation structural body is placed in a predetermined position and in a predetermined container, can solve the above problem.

The first water activation method according to the present invention features to increase the quantity of dissolved oxygen in the processed water as well as (concurrently) activate the water by leading the water or the aqua media to pass or leaving it to stay in the field which is made by the energy concentrated fields in the activation structural body, which has fields of energy concentration generated between neighboring particles, and which are placed at a position where the wave energy intrinsic to each atom or the fluorocarbon of the particles is amplified, and wherein the particles are composed of a single elementary material selected from a group of silicon, titanium, nickel and samarium or fluorocarbon.

By using such activation structural body, it is possible to activate water without externally supplying the energy or with supplying little energy.

Since the quantity of the dissolved oxygen is increased in the activated water, the activated water is preferably used for various applications.

The second water activation method according to the present invention features to increase the quantity of dissolved oxygen in the water or the aqua media by leading the water or the aqua media to pass through or leaving it to stay in the field, which is made by the energy concentrated fields in the activation structural body, which has fields of energy concentration generated between neighboring particles, and which are placed at a position where the wave energy intrinsic to each atom or the fluorocarbon of the particles is amplified, and wherein the particles are composed of a single elementary material selected from a group of silicon, titanium, nickel and samarium or fluorocarbon.

It is possible to activate the water by leading the water or aqua media passing by the strong energy concentrated fields which are generated between the activated portions constructed by the activation structural bodies or preferably in the gaps of the activated portions locating at the tops of the triangles.

This water activation method is effective mainly for refining the clusters of the water.

The first water activation apparatus of the present invention comprises a water tank to activate water or aqua media and at least one activation part which is set in the water tank, wherein said activation part is constructed by an activation structural body, which has an energy concentrated field between particles, which are composed of a single elementary material selected from a group of silicon, titanium, nickel and samarium or composed of fluorocarbon, of which single elementary material or fluorocarbon is placed at a position where wave energy intrinsic to each atom or said fluorocarbon is amplified.

By using such activation structural body, it is possible to activate water without externally supplying the energy or with supplying little energy.

Since the quantity of the dissolved oxygen is increased in the activated water, the activated water is preferably used for various applications.

The second water activation apparatus of the present invention comprises a housing having, a water supply tap, and a drain, and a water activation part attached to a circumference of said housing or inserted to an inside of said housing, wherein the activation part is constructed by an activation structural body which has an energy concentrated field between particles, wherein the activation structural body is made of particles composed of a single elementary material selected from a group of silicon, titanium, nickel and samarium or composed of fluorocarbon, of which the single elementary material or fluorocarbon is placed at a position where wave energy intrinsic to each atom or said fluorocarbon is amplified.

It is possible to activate the water by leading the water or aqua media passing by the strong energy concentrated fields which are generated between the activated portions constructed by the activation structural bodies or preferably in the gaps of the activated portions locating at the tops of the triangles.

This water activation method is effective mainly for refining the clusters of the water.

The word "activation" implies to give energy to the processed material such as molecules and atoms. Therefore it implies that the word "activation" implies to excite molecules and atoms.

BRIEF DESCRIPTION OF DRAWINGS

FIG. 1 is a perspective drawing that shows an example of the configuration of activation structural body. FIG. 1 (a) is a perspective drawing that shows an overall view of the activation structural body. FIG. 1 (b) is a perspective drawing that shows an example of the fundamental configuration shown in FIG. 1 (a) and FIG. 1 (c) is a perspective drawing that shows an overall view of the activation structural body. FIG. 1 (d) is a perspective drawing that shows an example of fundamental configuration of activation structural body.

FIGS. 2 (a) and (b) are electron microscopic photos of the shapes of particles that construct the activation structural body and the shapes of the particles for comparison.

FIG. 3 is a drawing that shows a preferable structure of the activation structural body. FIG. 3 (a) is a perspective drawing that shows the original shape before forming the activation structural body into an I type structure. FIG. 3 (b) is a perspective drawing that shows an L-shaped plate construction of the activation structural body. FIG. 3 (c) is a perspective drawing that shows a U-shaped plate construction of the activation structural body. FIG. 3 (d) is a perspective drawing that shows an S-shaped plate construction of the activation structural body.

FIG. 4 (a)-(c) are electron microscopic photos that show the shape of the particles that construct the activation structural body that is shaped into plate form of the present invention and the shape of the particles for comparison.

FIG. 5 (a) to FIG. 5 (g) are the perspective drawings that show other examples of the shapes of the activation structural body.

FIG. 6(a) to FIG. 6(f) show sectional views of the shapes shown in FIGS. 5(a)-5(f).

FIG. 8 (*a*) to FIG. 8(*b*) are cross sectional drawings that show an example of the water activation apparatus filled with the plate-formed activation apparatus.

FIG. 10(*a*) to FIG. 10(*b*) are cross sectional drawings that show another example of the water activation apparatus filled with the plate-formed activation apparatus.

FIG. 11(*a*) to FIG. 11(*b*) are cross sectional drawings that show another example of the water activation apparatus filled with the plate-formed activation apparatus.

FIG. 13(*a*) to FIG. 13(*b*) are cross sectional drawings that show another example of the water activation apparatus filled with the plate-formed activation apparatus.

FIG. 17 (*a*) is a perspective drawing that shows an overall view of the water activation apparatus. The figures as FIG. 17 (*b*) to (*d*) are cross sectional drawings that show the examples of filling the activation structural body.

FIG. 19 is a cross sectional drawing that shows the conventional electrolytic water. FIG. 19 (*a*) is a schematic that shows an apparatus to electrolyze the water. FIG. 19 (*b*) is a schematic that shows an example of the apparatuses to produce alkali ion water. FIG. 19 (*c*) is a schematic that shows an example of the apparatuses to produce strong acid water.

FIG. 21 is ultra-violet spectra that show the results of water activation done by the apparatus shown in FIG. 17.

BEST MODE FOR CARRYING OUT THE INVENTION

Figure 7:
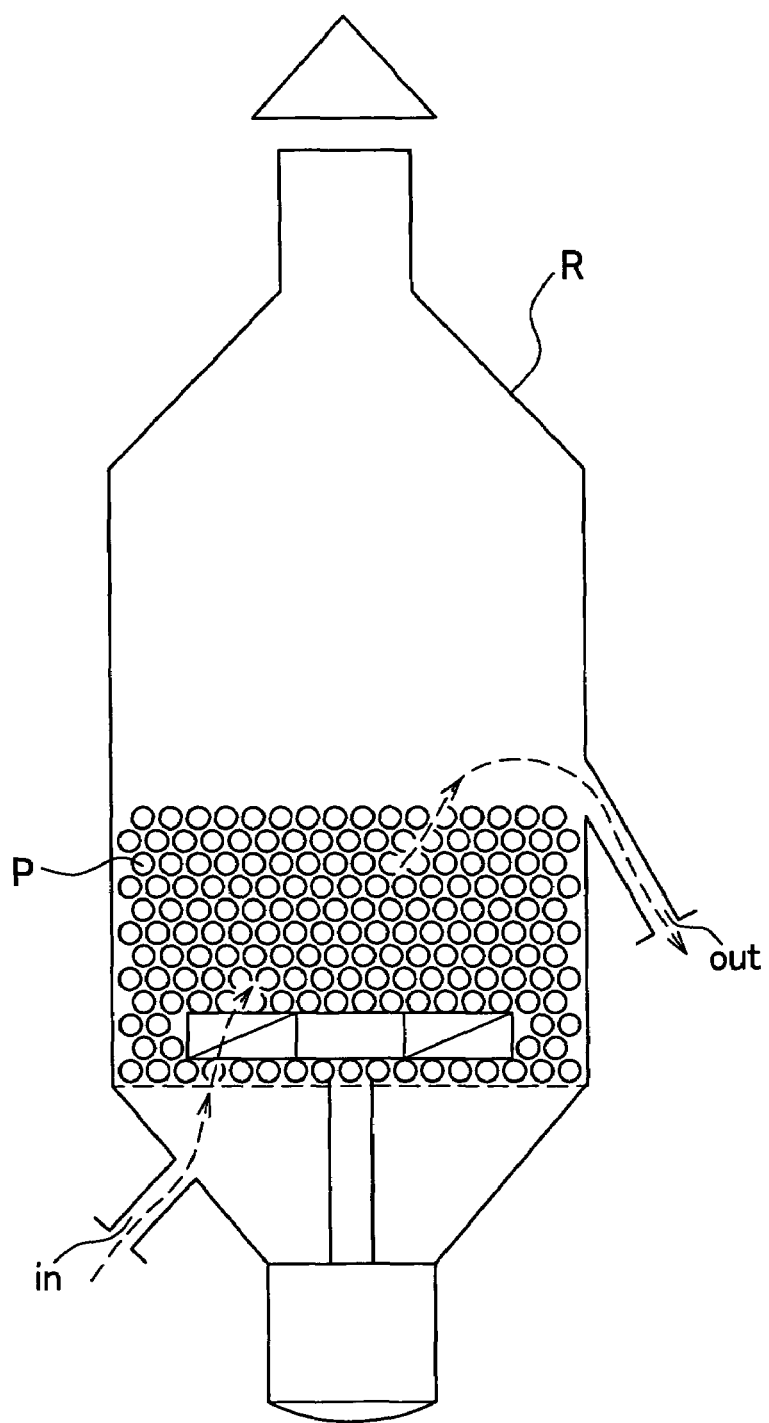
FIG. 7 is a cross sectional drawing that shows an example of the water activation apparatus filled with the activation structural body (fluidized bed construction).

The implementations of the present invention will be discussed.

(Activation Structural Body)

To begin with, the fundamental composition of the activation structural body will be explained by using FIG. 1 and FIG. 2.

(Composing Elements)

The activation structural body according to the present invention comprises a group of silicon, titanium, nickel and samarium. The selection of these elementary materials has been done in repeated experimental works that the inventor did. Silicon, titanium and nickel are metal elements which have the outermost core electron orbits (M, N), an even revolution electron number (2), and hardly reacts with oxygen. Samarium is a rare earth element that has the outermost core electron orbits (M, N), an revolution electron number (2), and hardly reacts with oxygen. Nickel and Samarium have strong magnetization.

The activation structural body of the present invention uses a single element among these elementary materials and the purity of the elements is appropriately selected depending on the kind and the degree of activation of the elements to be used. For example, in the case when hydrogen and oxygen are generated by activating water using the activation structural body for which silicon is used, the purity of silicon may be more than 90% and preferably 95%. The higher the purity, the more preferable the effect that can be obtained. Titanium, nickel and samarium, that is, the other atomic elements which can compose the activation structural body of the present invention, are preferred to have the same degrees of purity. In addition, the activation structural body of the present invention is generally composed of a single elementary material, such as silicon only, but the activation structural body of the present invention can be composed of combining several single elements.

For the activation structural body regarding the present invention, the above elements are granulated and the resultant particles are used for the activation structural body itself. It is preferred the particles may have a shape of a globe especially a pearl and the diameter may be in the range of 5 micrometers to 80 micrometers so as to provide an ease of being located in a predetermined place and an ease of composing the particles. It is relatively difficult to produce the particles in a diameter which is less than 5 micrometers, and it is relatively difficult to pass the material through the space between the particles. The space is the energy concentrated field as described later. When the diameter of the particles is larger than 80 micrometers, no sufficient energy is generated between the particles. Generally it is difficult to generate the energy of the present invention that activates the materials.

It is preferred the grain size distribution of the particles is narrowed as much as possible. More specifically, according to the repeated preliminary experiments, it has been found a remarkable effect is obtained when the deviation of the grain size is within +/−15 micrometers (namely the difference of the large particle and the small particle is 30 micrometers).

The method to granulate in such a shape from the specific element of the activation structural body of the present invention is not specifically limited but may be the method for composing the particles, which is generally known in the field of catalyst manufacturing. For ease of manufacturing and for capability of better uniformity of the particle shape, the method of gas atomizing is preferred. However, the activation structural body of the present invention is not confined in the particles produced by the method of gas atomizing as far as the above shape of particles. For example, other conventional methods such as a sol-gel method may be preferably used and the jet crusher may produce the above globe particles. The jet crusher is appropriately used to produce various kinds of particles used for the activation structural body of the present invention since the jet crusher is the general production method to produce the catalyst particle as well as the gas atomizing method.

As shown in FIG. 1, the particle P which is composed of the elementary material selected from a group of silicon, titanium, nickel and samarium is placed in the location to increase the wave energy.

In other words, these elementary materials that are composed into the activation structural body of the present invention have the intrinsic frequency when they are ionized as shown in the table 1 from the equation given by $E=h\nu$ (where E is the ionization energy (eV) of each elementary material, h is Planck's constant and v is the frequency) and these elementary materials oscillate the electromagnetic vibration. These electromagnetic oscillations have predetermined perturbations and therefore it is expected the activation structural body of the present invention has an intrinsic vibration in the nominal state. By allocating the particles P to the place in order to effectively give the intrinsic vibration to each of these elementary materials, it is expected that the vibration energy is given to the materials that pass through or stay in the gap S formed between the particle and the materials are activated.

TABLE 1

| Atom | Ionization Energy (eV) | Frequency ($\times 10^{15}$ Hz) |
| --- | --- | --- |
| Si | 8.144 | 1.971 |
| Ni | 7.63 | 1.846 |
| Ti | 6.82 | 1.649 |
| Sm | 5.63 | 1.361 |

As it has not been well analyzed, but the present inventor has found fluorocarbon has the similar effect as a metal selected from the group of silicon, titanium, nickel and samarium by repeated experiments. Therefore, it is concluded the activation structural body includes the particles which are composed of the fluorocarbon.

The above effect of the activation structural body of the present invention has been identified by repeated experiments based on the above phenomenological and theoretical studies as have been discussed. It has been found a high activation is obtained by placing the particles in the vertexes of a triangle preferably an equilateral triangle, for example, as shown in FIG. 1 (*b*), when the particles are practically maintained in uniform grain sizes (pearl shapes in identically same diameters). Namely, when a material passes through or stays in the gap S (an energy concentrated field) between particles P which are composed of the specific elementary materials, the intrinsic vibration, and perturbation etc. of the activation structural body of the present invention gives high energy to the material.

The activation structural body of the present invention places the particles which are composed of the predetermined elementary materials at the location of the activation structural body. In addition, the particles are not necessary to become complete globe shapes in the practical cases and the grain sizes of the particles are not uniformly the same and therefore it is difficult to place the particles at the vertexes of the equilateral triangles. The expression used in the present invention as, "to place the particles at the vertexes of the equilateral triangles", implies to include non-idealistic cases as described above as the practical case. The particles are practically placed as shown in FIG. 2 (*a*) which is a reference figure. The particles P shown in FIG. 2 (*a*) are produced by gas atomizing method, filtrated by a mesh with 52 micrometers and then placed after collecting the particles (with uniformly the same diameters).

As shown in FIG. 1 (*b*), the triangle space formed by the gap S which is surrounded by the particles has vertices of which angles are formed by the tangential lines to the particles and are necessary to be less than 90 degrees, preferably from 39 to 70.5 degrees and idealistically 60 degrees.

As shown in FIG. 1 (*d*), it has been found the highest activation is obtained when the particle of the present invention is placed in the vertex of the regular tetrahedron. Namely, when a material passes through or stays in the gap S (an energy concentrated field) between particles P which are composed of the specific elementary materials, the intrinsic vibration and the perturbation etc. of the activation structural body of the present invention gives high energy to the material through the topology of the regular tetrahedron rather than the equilateral triangle. Similar to the equilateral triangle construction, the particles composed of the predetermined elementary materials are placed in such a location. In addition, the particles are not necessary to become complete globe shapes in the practical cases, and the grain sizes of the particles are not uniformly the same and therefore it is difficult to place the particles at the vertices of the regular tetrahedron.

Accordingly, the expression used in the present invention as, "to place the particles at the vertices of the regular tetrahedron", implies to include non-idealistic cases as described above in the practical case. The particles are practically placed as shown in FIG. 2 (*a*) which is a reference figure. The particles P shown in FIG. 2 (*a*) are produced by a gas atomizing method, filtrated by a mesh with 52 micrometers and then placed after collecting the particles (with uniformly the same diameters).

Analogous to the configuration that the particles are placed at the vertices of the equilateral triangles, the triangles that construct a regular tetrahedron have the triangle space formed by the gap S which is surrounded by the particles has vertices of which angles are formed by the tangential lines to the particles and are necessary to be less than 90 degrees, preferably from 39 to 70.5 degrees and idealistically 60 degrees.

The position where the wave energy is amplified is not limited to the vertices of the regular tetrahedrons as far as the intrinsic vibration and the perturbation etc. of the activation structural body of the present invention gives high energy to the material when a material passes through or stays in the gap S (an energy concentrated field) between particles P which are composed of the specific elementary materials. In other words, when the particles which have an irregular shape, for example, as shown in FIG. 2 (*b*) are placed at random, the intrinsic vibrations to each elementary material are mutually cancelled and it becomes difficult for a high energy field to be generated in the gaps between two particles, and no water activation is generated. The particles P shown in FIG. 2 (*a*) are produced by gas atomizing method, filtrated by a mesh with 52 micrometers and then placed after collecting the particles (with uniformly the same diameters).

(Plate Activation Structural Body)

A plate activation structural body is used for a preferred implementation of the present invention. The plate activation structural body is explained by using FIG. 3 and FIG. 4.

(Composition of Plate Activation Structural Body)

The present activation structural body is provided by forming the above particles into the plate activation structural body by means of pressing, sintering etc. Namely, as shown in FIG. 1 (*a*), the particles P which are composed of a single elementary material selected from a group of silicon, titanium, nickel and samarium or fluorocarbon are placed at vertices of equilateral triangles or the vertices of the regular tetrahedrons, where the wave energy intrinsic to each atom or the fluorocarbon of the particles is amplified.

In response to the structure of the water activation apparatus which is constructed with the plate activation structural body, the plate activation structural body is formed into an L type as shown in FIG. 3 (*b*), a U type as shown in FIG. 3

(c) and an S type as shown in FIG. 3 (d). The plate activation structural body in this invention does not imply the strict shapes but fabrication of the activation structural body with a predetermined thickness, width and length. The terminologies "an L type", "a U type" and "an S type" are not necessary to be strict shapes as "an L type", "a U type" and "an S type". For example, the plate activation structural body of "a U type" can be in a shape of three planar plates which are combined in right angles without any curved surfaces.

The plate activation structural body of the present invention forms a large amount of the gap S which is the field of energy concentration between the particles P (the preferable shape of the gap is not shown since it may be the same as the particles for the above activation structural body). In other words, even being formed into the plate shapes, the same activation effect of the materials is obtained as far as the particles P which are composed of a single elementary material selected from a group of silicon, titanium, nickel and samarium or fluorocarbon are placed at the position where the wave energy intrinsic to each atom or the fluorocarbon of the particles is amplified.

However, if the above particles are placed out of the range specified in the present invention, that is, in random, the activation effects of the activation structural body of the present invention is not obtained even there is a certain gap between two particles.

Various physical dimensions of the plate activation structural body of the present invention are used for the application. In order to effectively lead (for passing through or staying in) the water or the aqua media into the energy concentrated field, the thickness of the plate should be 350 to 1500 micrometers and preferably 500 to 1000 micrometers (so that the particles that compose the activation structural body of the present invention have 5 to 15 layers of thickness). When the plate thickness is less than the above range, the plate activation structural body of the present invention becomes fragile and more careful handling is required. When the plate thickness is more than the above range, the water or the aqua media cannot be led into the energy concentrated field in the plate activation structural body.

It is preferred that the porosity is in the range of 45 to 60% of the total structure, especially about 50%. When the plate activation structural body uses the porosity of the above range, the water or the aqua media can be led into the energy concentrated field and be processed therein. When the porosity of the activation structural body is larger than the above range, high pressure is necessary to process the water or the aqua media, there is a possibility that the plate activation structural body may be broken or the foreign materials in the water or the aqua media may become jammed in the energy concentrated fields. Reversely, when the porosity of the plate activation structural body is smaller than the above range, the time for the water or the aqua media to pass through or to stay in the energy concentrated fields is not sufficient, and activation cannot be obtained. The most preferable porosity of the plate activation structural body is about 50%.

(Activation Structural Body with the Other Shapes)

In the other preferable implementations of the present invention, the activation structural body of the present invention can use various shapes other than plate activation structural body as explained above. As for these plate activation structural bodies, we will explain the details by using FIG. 5 and FIG. 6.

The plate activation structural bodies of the present invention can be formed in various shapes as shown in the figures other than the plate activation structural bodies as explained above. For example, a star shape (as Portugal "confeito") FIG. 5 (a)), a disc shape (FIG. 5 (b)), a plate shape with at least one hole (FIG. 5 (c)), a globe shape (FIG. 5 (d)), spheroid shape (FIG. 5 (e)), a gourd shape (FIG. 5 (f)), a honey comb shape (FIG. 5 (g)) etc. are possible to be adopted. In other words, the activation structural bodies of the present invention is formed into the similar shapes and physical dimensions of the conventional catalyst as shown in FIG. 5 (a) to FIG. 5 (g), and then it is possible to treat in the similar way as the conventional catalyst particles. Also it is possible to exploit the reactor apparatus using the conventional catalysts to the water activation apparatus using the activation structural body of the present invention.

In addition, as shown in FIG. 6 (a) to FIG. 6 (f), the activation structural body (activation structure) of the present invention as shown for example in FIG. 5 (a) to FIG. 5 (f) can be formed on the materials that are less reactive to the particles regarding the present invention or the metals that have high specific heat, wherein the materials and the metals are shown in the hatched portions in FIG. 6 (a) to FIG. 6 (f). In these formations, it is possible to manufacture the activation structural body under low cost, or to effectively ease the thermal exchange between the activation structural body and the water or the aqua media when high thermal conduction metals are used.

The methods for coating the activation structural body of the present invention onto the cores are realized by the conventionally known methods such as dip and dry method and spray and dry method.

(Manufacturing of Activation Structural Body)

The manufacturing methods of the activation structural body and plate activation structural body will be explained as follows.

(Manufacturing of Particles: Step a)

To begin with, the particles made of fluorocarbon or the predetermined elementary material which is the fundamental compound of the activation structural body will be explained. The forming method of the particles is as follows.

For example, the particles are formed into a globe shape, especially in a shape of pearls by using well-known methods in the catalyst such as gas atomizing method, sol-gel method, jet mill crushing method, etc.

(Anti-Electrostatic Process: Step b)

In the next step, the particles manufactured in the above step are processed to have anti-electrostatic properties for the purpose of easy placement of the particles amongst their alignments. The manufactured particles may not be placed at the predetermined positions due to the attraction forces or the repulsion forces generated by the electrostatic. The anti-electrostatic process is carried out by giving both positive ions and negative ions to the particles.

(Sinter Process: Step c)

The particles made of the predetermined elementary materials as charged as above or the particles composed of hydrogen fluoride are placed as shown in FIG. 1 (a) and are sintered in a predetermined shape. The sintering conditions are that the temperature is below the melting point temperature and sinter forming temperature (for example, 1200 to 1300° C. when silicon is used) of the elementary atom or fluorocarbon that granulates to be used and the time is 2.5 to 3.5 hours, sinter pressure is 12 to 25 MPa (the forming is carried out by CIP (Cold Isostatic Press) since fluorocarbon is not directly sintered). In this sinter condition, the plate activation structural body of the present invention as shown in FIG. 3 may have the alignment as shown in FIG. 1 (b). It is possible to obtain the activation structural body that has structures as shown in FIG. 5 other than the plate shapes of the present invention.

It is a feature that no binder is used in the sinter forming process, which is different from the conventional sinter process. In other words, by the sinter process using the conventional binder, the activation structural body or the activation structure of the present invention is hardly produced wherein the uniform energy concentration is maintained, since the impurity derived from the binder is attached to the surface of the particles and the activation of the particles may be lost. Of course, if the space between the particles of the present invention can be placed and the attachment of the impurity to the particle surface is prevented, it is possible to carry out the sinter forming with the binder and the manufacturing method of the present invention is not restricted by using or not using the binder. The sinter temperature when the binder is used is higher than the decomposing temperature of the binder.

The water activation process and the water activation apparatus will be explained as follows.

(Water Activation (Excitation))

It is possible to activate water and aqua media by using the activation structural body. The word "aqua medium" implies the water that includes water soluble or mixable materials, such as electrolyte materials as sodium chloride, the polar solvent such as a lower alcohol, aqua media including sugars and glycogenic material as various other materials than sugars, lactiferous liquid and the suspension water. The effluent and other exhaust water are included in "aqua medium".

The water or the water medium is particularly selected and it is activated by the activation structural body of the present invention and a mixed gas including hydrogen gas, oxygen gas and nitrogen gas. The mixed gas including oxygen and nitrogen is obtained by segregating hydrogen gas from the mixed gas obtained in this activation. Therefore, it is possible to produce air by processing water or water medium with the activation structural body The water activation method of the present invention is classified into (1) a method to lead the water or the water medium passing through and staying in the energy concentrated field in the activation structural body of the present invention and (2) a method to lead the water or the water medium passing through and staying in the gaps in the activation portion which is constructed by the activation structural body of the present invention. The method (1) is effective to increase the quantity of dissolved oxygen in the water at the same time to prepare the electrolytic water and the method (2) is effective to refine the cluster of the water. Of course, the combination of the methods (1) and (2) covers the technical range or scope of the present invention.

Water Activation (1):

(Preparatory Process: Removing Foreign Materials and Heating etc.)

To begin with, when the foreign materials are presented in the water or the aqua media that may clog the energy concentrated field in the activation structural body of the present invention, it is preferred that the water or the aqua media are led to pass through the activation structural body of the present invention after the foreign materials (for example, sands, micro particles presented in the brine when the brine is used) are removed by being aggregated, precipitated or filtrated. After removal of the foreign materials, the water or the aqua media can be led to pass through the activation structure of the present invention.

After the above process, the water or the aqua media are effectively used as the water that is the conventional electrolytic water (alkali ion water or strong acid water) or the conventional water which is increased with the quantity of dissolved oxygen.

Moreover, being different from the conventional technology, it is possible to increase the quantity of dissolved oxygen without using a microorganism, as well as to prepare the electrolytic water with less energy than by electrolysis.

Water Activation (2):

It is possible to refine the cluster of the water by leading the water or the aqua media to pass through the gaps formed by the activation portion preferably placed in the convexes of the triangles.

The water which is subjected to the cluster refinement can be effectively used, as well as the conventional water which is magnetized. For this process, being different from the case when the apparatus shown in the conventional technology is used, it is possible to decompose the cluster of water without direct contact to the magnetic metals. It is further possible to effectively refine the cluster of water by modifying the placement of the activation structural body.

(Water Activation Apparatus (1): Examples of Particle Activation Structural Body and Particle Activation Structure)

Preparing the fluidized bed construction generally used in the conventional catalyst fields or the reactor R, which has the fluidized bed construction with the activation structure P in a container that has inlet (in) and outlet (out) as shown in FIG. 7, it is possible to activate the water or the aqua media by leading it to pass through or stay therein. Therefore in the water activation apparatus of the present invention, it is possible to place the particle in a way that may be dynamically changing.

When the water activation apparatus of the present invention is constructed with the fluidized bed construction, the fluidized bed generates turbulent flow in the water and the aqua medium as the fluidized bed functions as a turbulent flow mechanism. When the water activation apparatus is constructed with the fixed bed construction, a turbulent generation mechanism (not shown in the figures) is prepared. As the result, the contact areas of the particle activation structural body or the activation structure as shown in FIG. 5 (a) to (f) against the water or the aqua media increase. In other words, the possibility (probability) that the water or the aqua media pass through or stays in the energy concentrated field of the particle activation structural body or the possibility (probability) that the water or the aqua media pass through the energy concentrated field of the particle activation structural body becomes high, and therefore the effective activation of the water or the aqua media become possible.

As being well-known in this technical field, it is in the scope of the present invention that the water or the aqua media are pre-activated by the activation structure as shown in FIG. 5 (a) to (f) in a preparatory process, and then the water or the aqua media are activated by the activation structure as shown in FIG. 5 (a) to (f) as the main process.

(Water Activation Apparatus (1): a Planar Activation Structure)

In a specific implementation of execution of the present invention, the water activation apparatus regarding the present invention has a construction such that a planar activation structure is set in a water tank.

The embodiments of these implementations are explained with FIG. 8 to FIG. 14 as follows.

The figures as FIG. 8 to FIG. 14 show cross sectional views of apparatuses that activate water or aqua media with a preliminary thermal heating means.

As shown in FIG. 8 to FIG. 14, the water activation apparatus of the present invention is mainly constructed with the water tank 2 that has a planar activation structural body I and processes water or aqua media.

The water activation apparatus shown in FIG. 8 is an activation apparatus with a fundamental construction design that processes water or aqua media. The water activation apparatus shown in FIG. 8(a) is an embodiment that has a planar activation structural body set vertically in the water tank 2 and the water activation apparatus shown in FIG. 8(b) is another embodiment of the present invention that has a planar activation structural body is set to separate the water tank 2 in the upper portion and the lower portion. The water activation apparatuses as shown in FIG. 8(a) and FIG. 8(b) are the apparatuses that are designed under assuming gaseous generation in activating mainly water or aqua media therein.

In the water activation apparatus 1 as shown in FIG. 8(a), the planar activation structural body is set in such an arrangement that the longitudinal direction of the cross section of the planar activation apparatus is vertically placed. Water or aqua media are activated by leading them passing through or staying in the energy concentrated field under the water activation apparatus 1 shown in FIG. 8(a). On the other hand, in the water activation apparatus 1a as shown in FIG. 8(b), the planar activation structural body is set in such an arrangement that water or aqua media pass the inner and the longitudinal direction of the cross section of the planar activation apparatus. Water or aqua media are activated by leading them to pass through or stay in the energy concentrated field under the water activation apparatus shown in FIG. 8(b).

The water activation apparatus 1 as shown in FIG. 8(a) has a construction such that the plural planar activation structural bodies I (I type) are placed in parallel in a water tank 2. The water tank 2 has a gas outlet 3 in order to purge the gases generated in the activation process of water or aqua media. The generated gases have been analyzed and it has been found that the gases include large extent of hydrogen, oxygen and nitrogen gases. When the planar activation structural body activates water at the energy concentrated field into which the water is led, the generated gases do not stay at the energy concentrated field, but are suspended upward as a state of gaseous bubbles. The rising of the gaseous bubbles generated at the energy concentrated field generated convection of water or aqua media is shown by the arrows in FIG. 8(a). According to such generation of water or aqua media, the gaseous bubbles purged when water or aqua media are activated by the planar activation structural body I do not stay in the energy concentrated field for long a time, but quickly float up to the surface of water or aqua media.

As explained above, the construction may be such that the activation structural body, which is placed along the longitudinal cross section of the planar activation structural body, which can effectively activate water or aqua media by leading water or aqua media passing through or staying in the energy concentrated fields of the activation structural body.

On the other hand, the water activation apparatus 1a as shown in FIG. 8(b) has a construction such that the water tank 2 is separated into upward and downward directions by the planar activation structural body.

In order to separate the water tank 2 into upward and downward directions, the simplest construction is to separate the water tank 2 by a planar activation structural body I set in parallel to the bottom of the water tank 2 (not shown in the figures). The construction such that the planar activation structural body is vertically set against the water tank 2 as well as the water tank 2 being separated into upward and downward directions against the planar activation structural body, is preferred for the convection of water and aqua media.

The water activation apparatus 1a shown in FIG. 8(b) has the construction such that the planar activation structural body is vertically set against the water tank 2, as well as the water tank 2 being separated in upward and downward directions against the planar activation structural body. That is, the construction is that the horizontal plane of the water tank is cut-off by the combination of an S-shaped planar activation structural body S, or an I-shaped planar activation structural body I, or an L-shaped planar activation structural body L, or a U-shaped planar activation structural body U (the activation apparatus is generically named as activation structural body S).

The water activation apparatus 1a may be constructed such as shown in FIG. 8(b). Gases may be generated by activating the water that invades into the energy concentrated field at the activation structural body S, where the gases including hydrogen are generated by activating, for example, water using the energy concentrated field. The generated gases do not stay in the energy concentrated field but rise upward as gaseous bubbles. The rising of the gaseous bubbles generated at the energy concentrated field generates convection of water or aqua media as shown by the arrows in FIG. 8(b).

Since the activation structural body S separates the water tank 2 in upward and downward directions in a horizontal plane, the gaseous bubbles generated by the water activation pass the activation structural body S and rise to float. In such a construction of the apparatus, the probability of the water or aqua media to invade into the energy concentrated fields and the activation rate (reaction rate) increases in such structure.

The preferred implementation of the water activation apparatus that has such a fundamental construction will be explained by using FIG. 8 to FIG. 16. In the explanation of the following application, the common explanation covering the water activation apparatus 1 of which construction is shown in FIG. 8(a) and the water activation apparatus 1a of which construction is shown in FIG. 8(b) is given by explaining the water activation apparatus 1 of which construction is shown in FIG. 8(a) and the water activation apparatus 1a of which construction is shown in FIG. 8(b) is cancelled.

Figure 9:
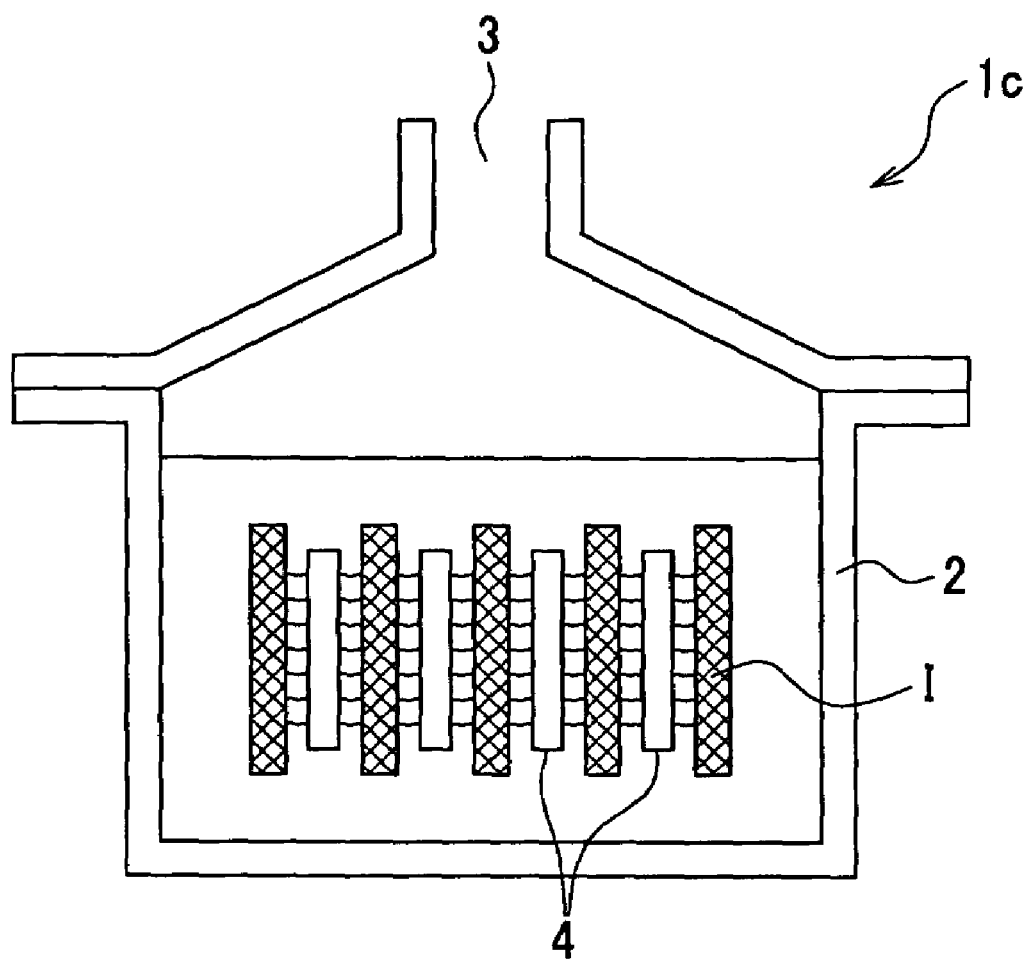
FIG. 9 is a cross sectional drawing that shows another example of the water activation apparatus filled with the plate-formed activation apparatus.

The water activation apparatus 1c as shown in FIG. 9 is a water activation apparatus that has a construction to generate a convection of water or aqua media by heating the water or the aqua media. The water activation apparatus 1c is applicable to the water activation apparatus 1 which has an arrangement that the activation structural body is set in the cross sectional length direction planar activation structural body I shown in FIG. 8(a) and the water activation apparatus 1c which activates the materials by leading the water or aqua media to pass through the activation structural body.

The water activation apparatus 1c as shown in FIG. 9 comprises plural planar activation structural bodies I in parallel and the water tank 2 which has heating means separately set between the planar activation structural bodies I. The quantities of the planar activation structural bodies I and heating means are not specifically limited but preferably selected to meet the requirements by the kinds of water or aqua media and the capacity of the water tank 2.

In this construction, the radiation heat emitted from the heating means 4 as the heating element is absorbed by the water or the aqua media which is a fluid approximate to the heating element and then the convection of water or aqua media is generated. When convection is generated in the water or the aqua media, the probability that the water or the aqua media pass through the energy concentrated fields (not shown in the figures) increases and the activation of the water or the aqua media is accelerated.

Figure 15:
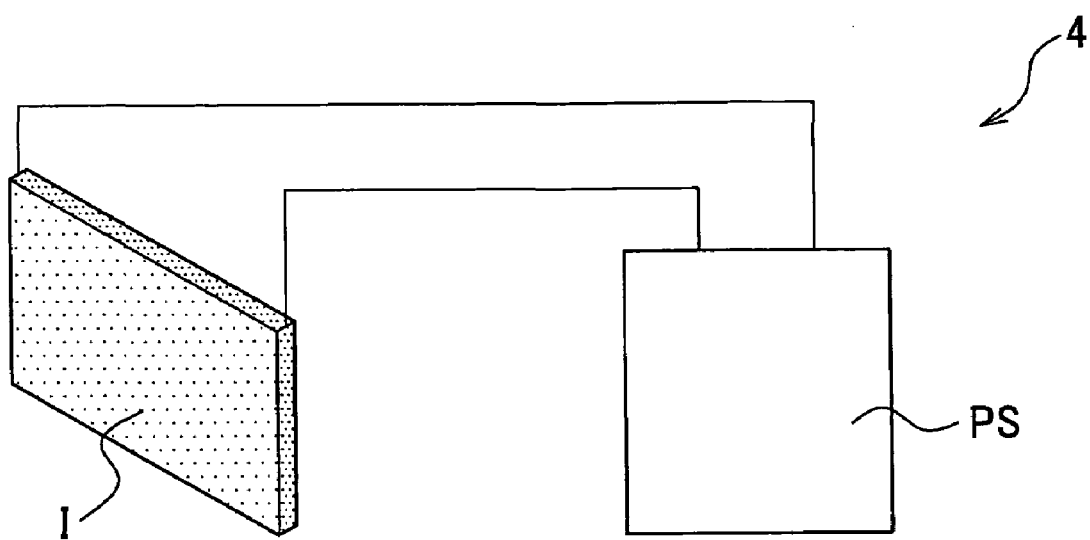
FIG. 15 is a perspective drawing that shows an example of method to heat plate-formed activation apparatus (plating).
Figure 16:
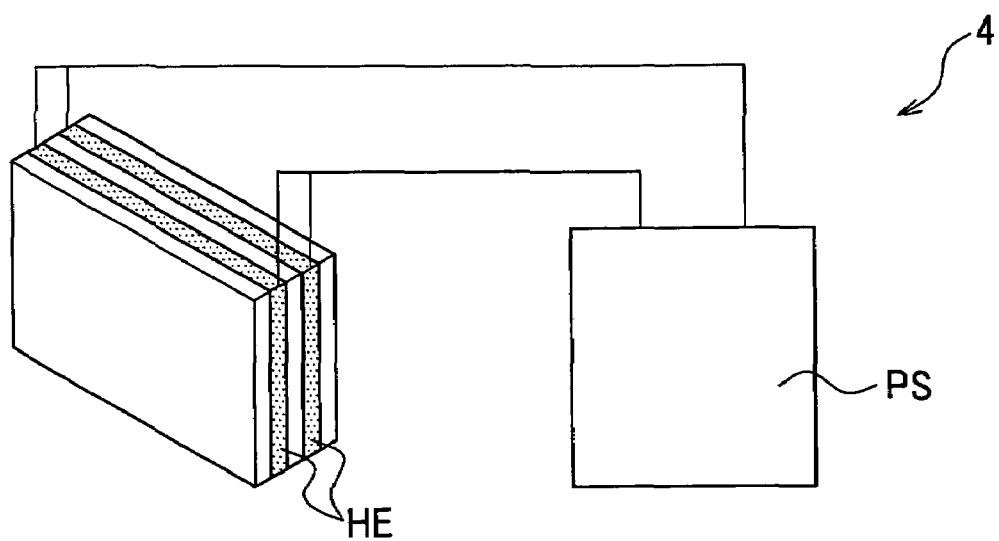
FIG. 16 is a perspective drawing that shows another example of method to heat plate-formed activation apparatus.

The example of heating by the planar activation structural body is shown in FIG. 15 and FIG. 16.

That is, FIG. 15 is a perspective schematic that shows an example of methods to directly heat the planar heating structure. FIG. 16 is another perspective schematic that shows another example of methods to directly heat the planar heating structure.

The heating means 4 that heats the planar activation structural body as shown in FIG. 15 is constructed in such a way that the planar activation structural body I is heated by applying voltage of the voltage supply PS through a conductive cable to the planar activation structural body I which is plated with hetero conductive metals.

The thickness of the plated hetero conductive metals is selected so as not to block the operation of the activation structural body, such as 3 to 5 micro meters. The partial plating is effective for heating.

The heating means 4 as shown in FIG. 9 may be attached to all of five planar activation structural bodies as shown in FIG. 9. It can be possible that the heating means is placed in a part of the activation structural body or in every 2 pieces of the planar activation structural bodies. In a case when the heating means 4 as shown in FIG. 15 is applied to the plural planar activation structural bodies 1, all of the planar activation structural bodies are connected in parallel or in serial by conductive cables and a single power supplier or a plurality of separated power suppliers are used to apply voltage.

In this construction, it is possible to freely control the heat value of the planar activation structural body I. Since the convection of water or aqua media can be controlled by freely changing the heat value, it is possible to control the activation rate of material. The control of the activation rate of the material by this method is easier in comparison with the water activation apparatus 1 and activation apparatus 1a which naturally generate convection as shown in FIG. 8.

The heating means 4 shown in FIG. 16 has a construction such that a heating element HE is set between the planar activation structural bodies I.

The heating element HE is necessary to be porous in order to effectively lead the water or the aqua media to the energy concentrated fields. It is possible to select such porous heating elements HE can be selected from the well-know products.

Since the convection of water or aqua media is possible by controlling the heating value of the heating elements, it is possible to control the activation rate of materials. The control of the activation rate of materials is easier in comparison to the water activation apparatus 1 and water activation apparatus 1a as shown in FIG. 8.

The heating means 4 as shown in FIG. 15 and FIG. 16 can obtain the similar effect by applying the similar construction to the planar activation structural body set in the vertical direction of the planar activation structural body S in the activation apparatus 1a as shown in FIG. 8 (b).

(Application Example 2: Indirect Heating of the Activation Structural Body)

The water activation apparatus as shown in FIG. 10 comprises the water tank 2 in which a planar activation structural body I (S) is placed and the heating means 4 to externally heat the water or the aqua media in the tank 2.

The water activation apparatus 1d as shown in FIG. 10 (a) is an example of the construction such that the heating means 4 is attached to the water tank 2. For example, it may be possible to attach the heating means 4 to the side walls of the water tank 2 or to attach the heating means in a way to cover the entire surface of the water tank 2. The water activation apparatus 1e has a construction to mold the external heating device as heating means 4 with the water tank 2 into a single body. This construction is similar to the construction such that a gas burner heats water in a bath tub.

Being different from the water activation apparatus 1c directly heating the planar activation structural body as shown in FIG. 9, the water activation apparatuses 1d and 1e as shown in FIG. 10 use the method to indirectly heat the planar activation structural body I. Due to this construction, the convection of water or aqua media is generated in the water tank 2 as similar to the water activation apparatus 1c shown in FIG. 9. The probability that the water or the aqua media pass through the energy concentrated fields (not shown in the figures) increases and the activation of the water or the aqua media is accelerated.

Since it is possible to control the convection of the water or the aqua media by controlling the heat value of the heating elements, it is possible to easily control the activation rate similarly as shown in FIG. 9.

The water activation apparatus 1f as shown in FIG. 11 is a water activation apparatus that has a construction to control the relative height of the surface level of water or aqua media. By controlling the relative height of the surface level of water or aqua media, the contact area of the planar activation structural body I with the water or the aqua media can be changed. Therefore, it is possible to adjust the activation rate by changing the reactive volume.

The apparatuses of this sort of activation apparatus can have two types of construction. The first type is the water activation apparatus 1f as shown in FIG. 11 (a), which has such a construction that the external tank 5 and the water tank 2 are molded into a single unit and the surface level of the water or the aqua media is changed thereby. In the water activation apparatus 1f as shown in FIG. 11 (a), the external tank 5 changes the liquid quantity (volume) in the objective water tank 2 by a liquid quantity adjustment means (a liquid quantity valve etc.) which is not shown in the figures. By this means, the contact area between the planar activation structural body I and water and aqua media change in accordance with the liquid quantity. In other words, the volume of the planar activation structural body I soaked in the water or the aqua media changes. The absolute volume of the water or the aqua media passing to the energy concentrated fields of the activation structural body I thus changes with the volume of the planar activation structural body I soaked in water.

The second type is the water activation apparatus as shown in FIG. 11 (b), wherein the planar activation structural body I is vertically (in the direction of the height) moved by a vertical moving means 5'.

The water activation apparatus 1g as shown in FIG. 11 (b) is, different from the water activation apparatus if shown in FIG. 11 (a) that has a construction to change the volume of water or aqua media, changes the contact area between the planar activation structural body I and the water or the aqua media, wherein the construction is made in such a way to control the reaction volume of materials by the change of the contact area between the planar structure I and the liquid that is the water or the aqua media as well as the water activation apparatus if as shown in FIG. 11 (a).

As shown in FIG. 11 (a) and FIG. 11 (b), the construction that changes the mutual contact area between the planar activation structural body I and water or aqua media has an advantage to stop the activation of the water and the aqua media by completely ceasing contact of the planar activation structural body I and the water or the aqua media.

Figure 12:
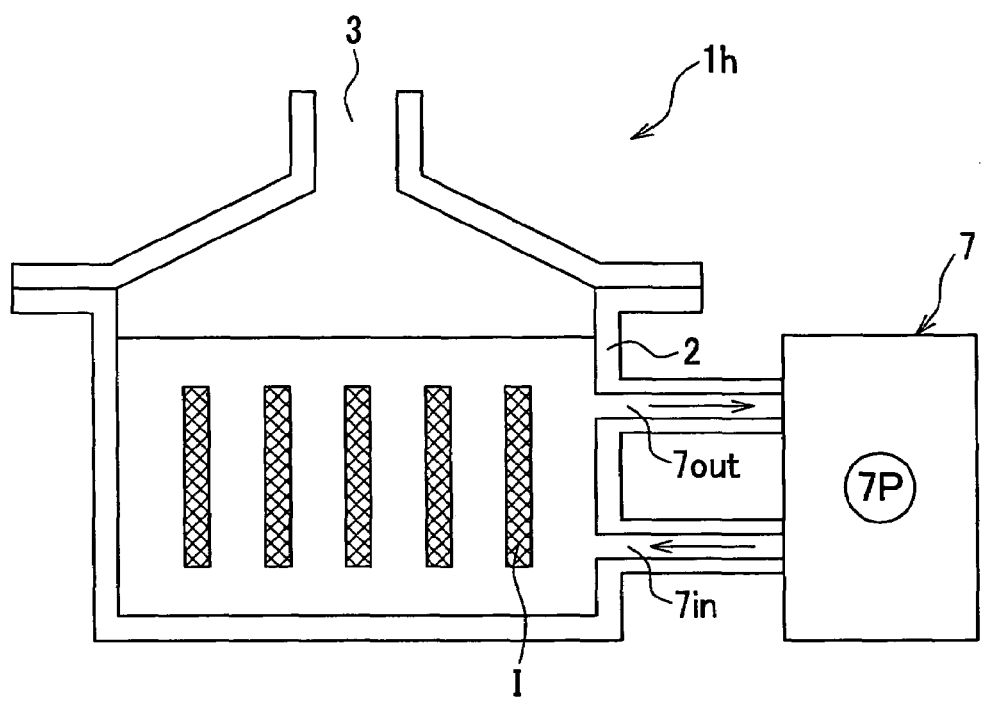
FIG. 12 is a cross sectional drawing that shows another example of the water activation apparatus filled with the plate-formed activation apparatus.

The water activation apparatuses 1h to 1j as shown in FIG. 12 to FIG. 13 (b) force water or aqua media to circulate by a circulation means that circulates the water or the aqua media.

The water activation apparatus 1h as shown in FIG. 12 has a construction that has an additional circulation means to the wall side of the water tank 2 of the present water activation apparatus as shown in FIG. 8.

The water activation apparatus 1h as shown in FIG. 12 is an example that constructs the circulation means with a circulation pump 7P, an inlet 7 in for the water and the aqua media and an outlet 7 out for the water and aqua media. In this construction, the water or the aqua media coming into the inlet 7 in which locates in the lower position on the wall of the water tank 2 is pumped out to the outlet 7 out which locates in the upper position on the wall of the water tank 2 with a predetermined flow rate.

The flow of the water or the aqua media by using the circulation means generates the forced convection of the water or the aqua media. Since the degree of the convection can be adjusted by the circulation pump 7P, the activation rate of the water or the aqua media can be adjusted according to the requirements.

The water activation apparatus as shown in FIG. 13 (a) and FIG. 13 (b) has a construction such that the pump 7P that is a circulation means is installed in the bottom of the water tank 2. An outlet 7 out for the water or the aqua media is made in the bottom of the water tank 2 in the water activation apparatus 1i as shown in FIG. 13 (a) and an outlet 7 out for a drain of the water or the aqua media is made in the wall of upper position of the water tank 2 in the water activation apparatus 1j as shown in FIG. 13 (b).

As shown in FIG. 13 (a), a pump 7P is installed in the center of the bottom of the water tank 2 and plural outlets 7 out are made around the pump 7P in the water activation apparatus 1i. The water or the aqua media pumped out by the pump 7P is diffused in the water tank 2 in this construction.

The water activation apparatus 1j as shown in FIG. 13 (b) has a pump 7P in the center of the bottom of the water tank 2 and at least one outlet 7 out of water and aqua media in the higher position than that of the liquid level of the water or the aqua media. Therefore, the water or the aqua media pumped out to the upper liquid level of the water or the aqua media by the pump 7P overflows into the outlet 7 out and flows out from the water tank 2. In this construction, the water or the aqua media pumped out by the pump 7P is homogenously diffused in the water tank 2 of the water activation apparatus 1j as well as the water activation apparatus 1i shown in FIG. 13 (a).

The water activation apparatuses 1i and 1j that have a pump 7P as a circulation means in the bottom of the water tank 2 as shown in FIG. 13 (a) and FIG. 13 (b) not only can increase but also can adjust the activation rate of the water or the aqua media.

It is preferred that the water activation apparatuses 1i and 1j that have a pump 7P as a circulation means in the bottom of the water tank 2 as shown in FIG. 13 (a) and FIG. 13 (b) is applied to the water activation apparatus 1a of which fundamental construction is shown in FIG. 8 (b) wherein the water or the aqua media are activated by passing across the inside of the activation structural body S.

Figure 14:
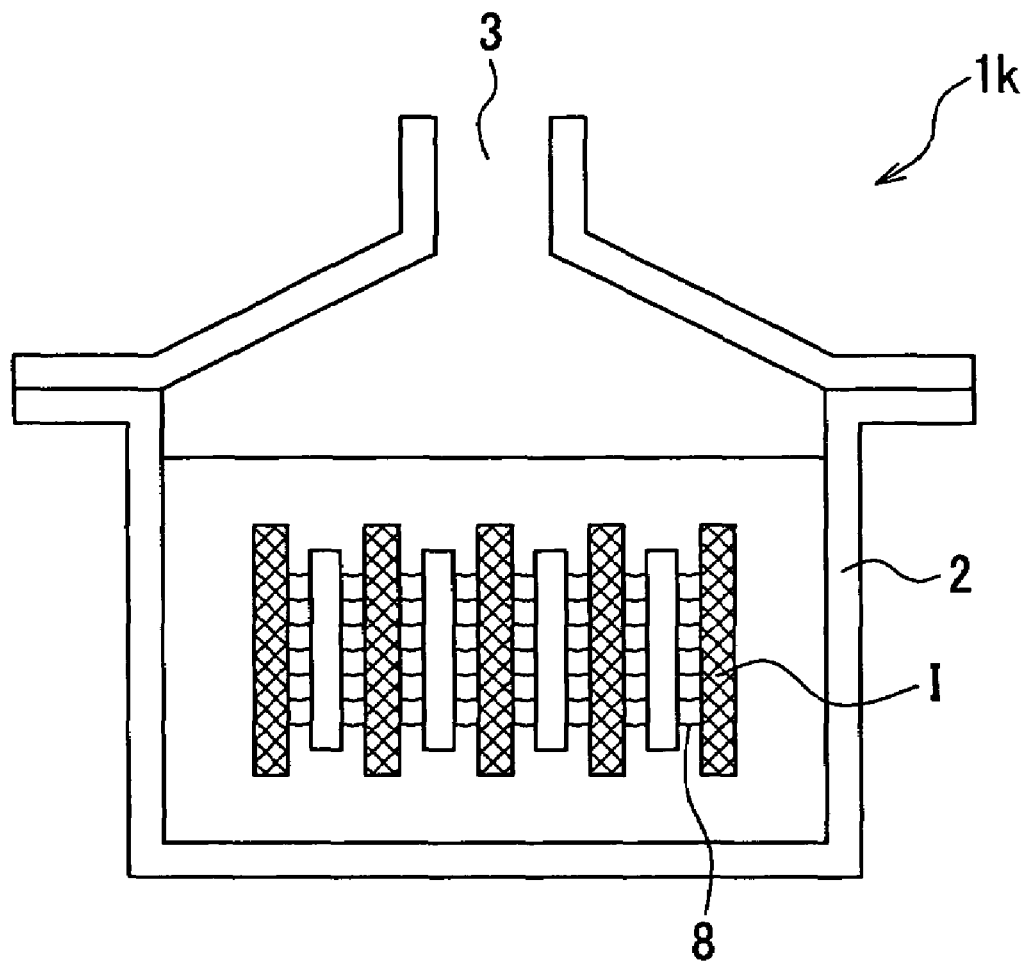
FIG. 14 is a cross sectional drawing that shows another example of the water activation apparatus filled with the plate-formed activation apparatus.

The water activation apparatus 1k as shown in FIG. 14 has oscillators 8 in parallel to the vertical direction of the planar activation structural body I (the planar activation structural body S).

It is possible to effectively lead the materials included in the inside of or in proximity to the planar activation structural body I to the energy concentrated fields, and therefore it is possible to activate water or aqua media in high efficiency by applying the vibration to the planar activation structural body I by means of the oscillator 8 installed therein. Especially, the water or the aqua media staying inside of the planar activation structural body I, particularly the gaseous bubbles generated in the process, can be purged therefrom.

As explained in the water activation apparatuses of FIG. 8 to FIG. 14, the combination of the technologies disclosed in the explanations covers the scope of the present invention. For example, the water activation apparatus that has the fundamental construction as shown in FIG. 8 can have heating means 4 and the circulation means.

It is possible that the activation structural body that has predetermined shapes or particles as shown in FIG. 5 and FIG. 6 may be set in a lower position or in an upper position of the water tank 2 as a fluidized bed construction.

Since water can be activated without applying electricity to the anodes and cathodes as seen in the conventional technologies, the energy consumption is quite low. It is also possible to prepare the electrolytic water by a simple construction such that the activation structural body of the present invention is merely set.

The electrolytic water prepared by using the water activation apparatus of the present invention can be used for various applications as well as the conventional technologies.

(Water Activation Apparatus (2): Refining Clusters)

As another implementation of the present invention, a water activation apparatus wherein water or aqua media are led to pass through the gap between two activation structural bodies is provided. This water activation apparatus is mainly the device to refine clusters of water.

Figure 17:
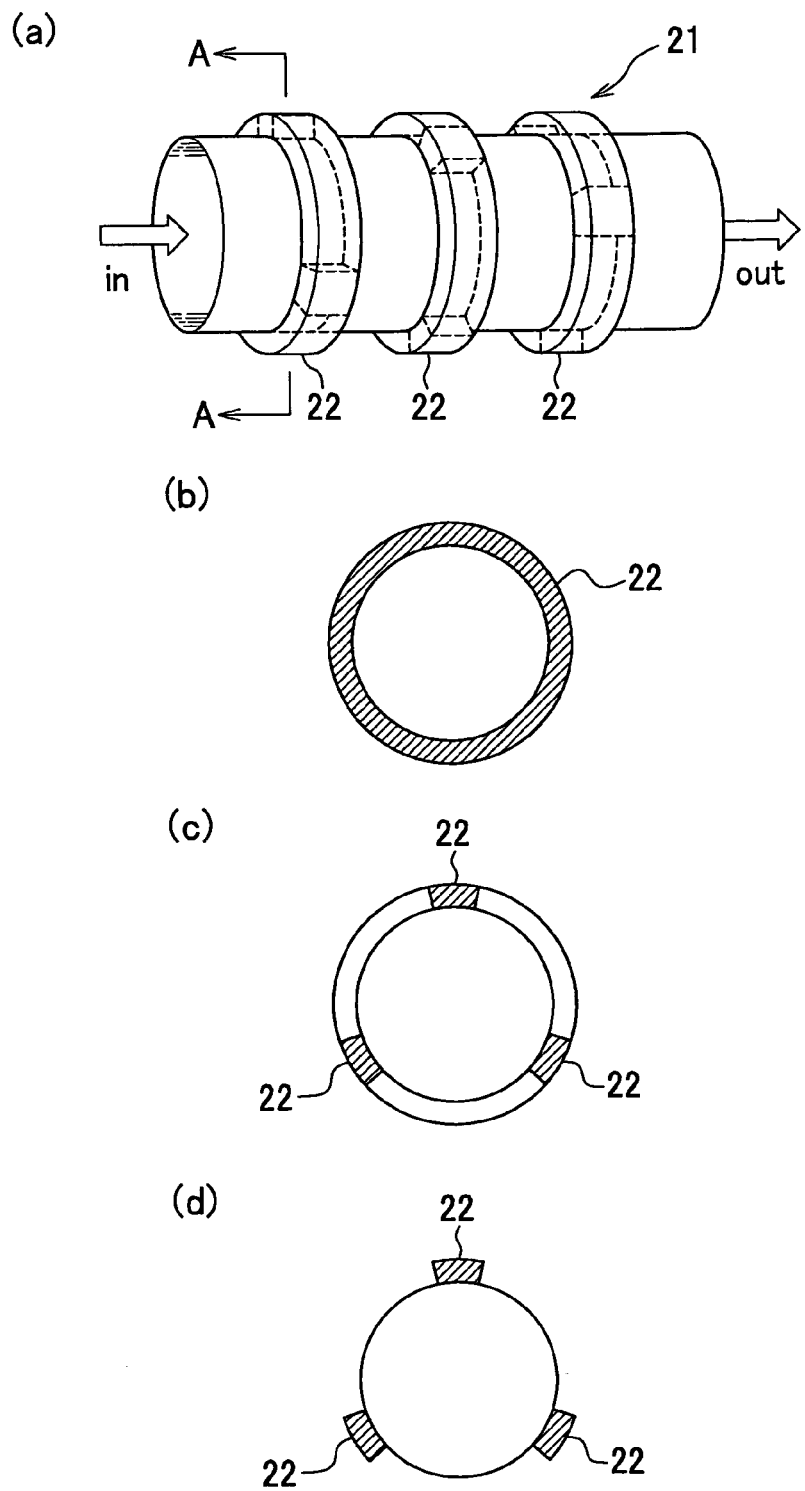
FIG. 17 (*a*) to (*d*) are drawings that show other examples of the water activation apparatuses regarding the present invention.
Figure 18:
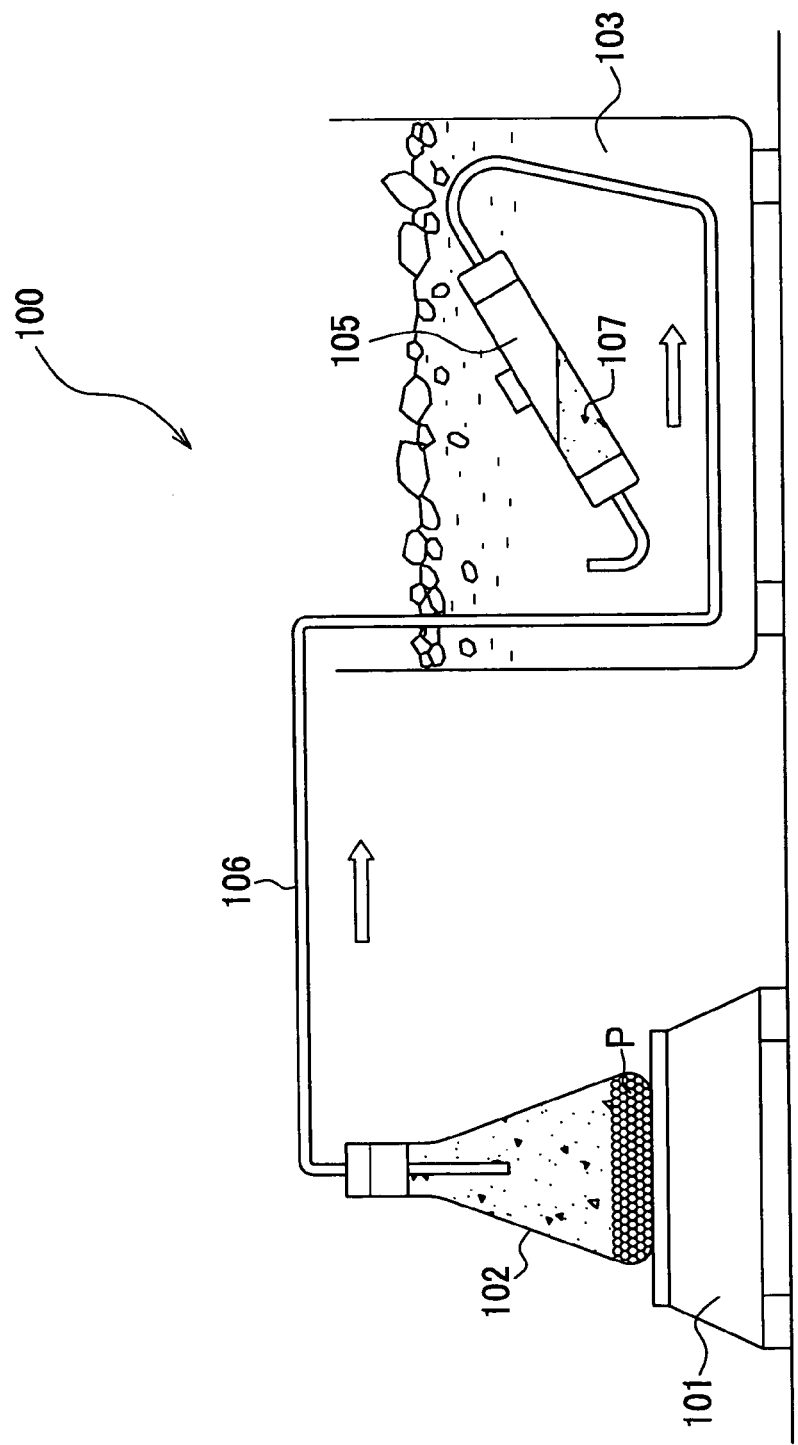
FIG. 18 is a schematic that show an experiment to analyze the water.
Figure 20:
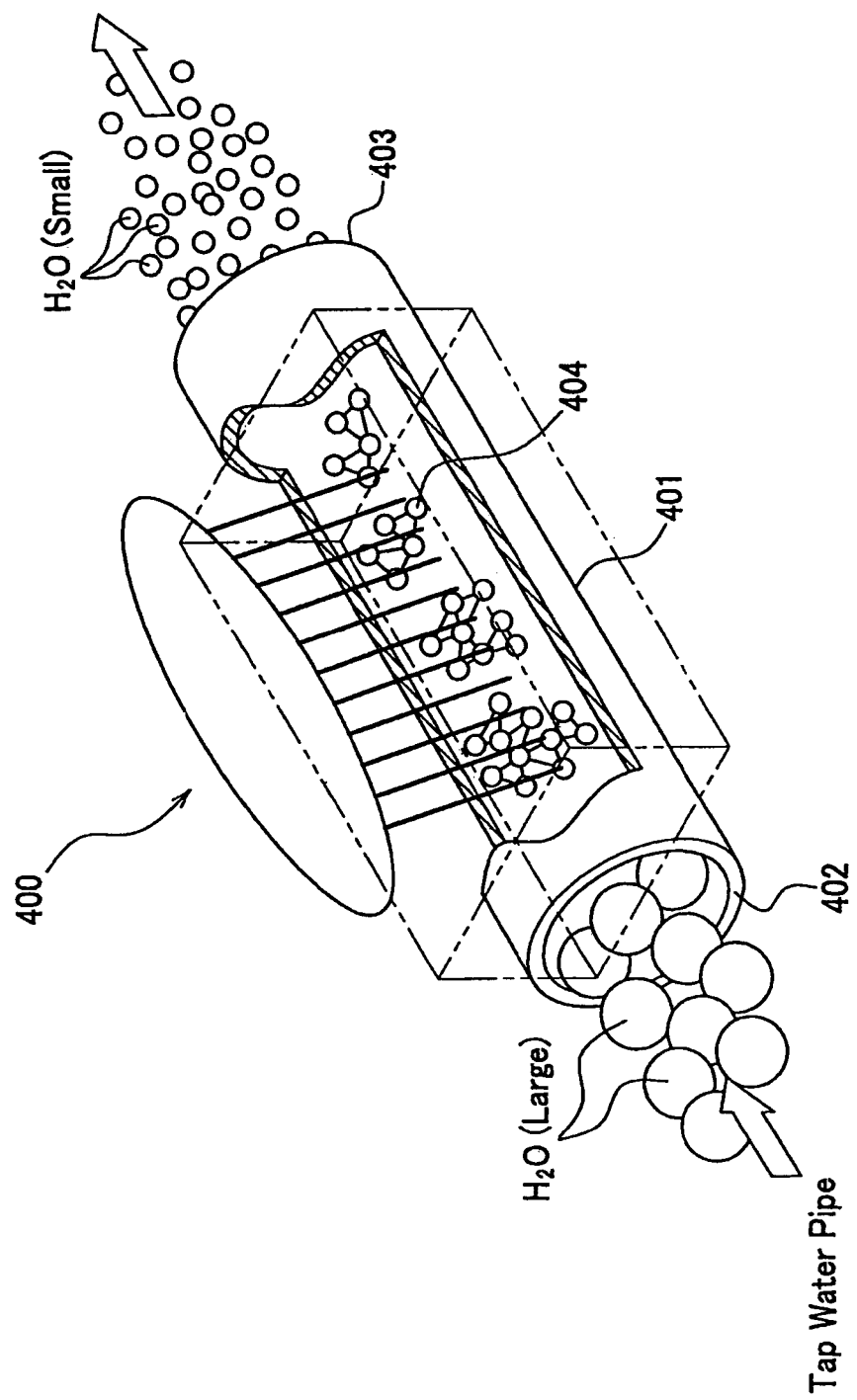
FIG. 20 is a cross sectional drawing that shows an example of conventional apparatuses that magnetically process the water.

FIG. 17 (a) is a perspective schematic that shows an example of the water activation apparatus regarding the present invention. The schematics of FIG. 17 (b) to FIG. 17 (d) show the cross sectional views after cutting by the surface A-A.

According to FIG. 17 (a), the water activation apparatus in this implementation is constructed with the activation apparatus unit 21 that has the inlet in and the outlet out of water. An activation part 22 comprising at least one of the activation structural bodies is attached to the outer surface of the activation apparatus unit 21.

This activation part 22 can have various forms as shown in FIG. 17 (b) to (d). In other words, the activation structural bodies (particles, activation structures or planar activation structural bodies) may cover all outer surface of the activation apparatus unit 21 as shown in FIG. 17 (b) or a part of all outer surface of the activation apparatus unit as shown in FIG. 17 (c) or the planar activation structural bodies may be placed on the outer surface of the activation unit with an interval as shown in FIG. 17 (d). When the planar activation structural bodies is placed in this interval, each activation structural body can construct an equilateral triangle in the cross sectional view.

The activation part 22 may be formed to cover the whole surface in the lateral direction of the apparatus unit or may be formed from the plural activation parts 22 as shown by FIG. 17 (a). Since it is possible to refine the clusters of water without the contact between water and magnetic metals as seen in the conventional examples by this construction, the metal oxides or metal chlorides derived from the magnetic metals are not dissolved into water.

Since the activation parts composed with the activation structural bodies are placed outside, the maintenance is easy.

As described, the activation structural bodies can be used for activation of various materials, and it is possible to manufacture the devices that activate various materials by using simple construction. Therefore the water activation apparatus by using this activation structural body is usable for activating various materials without consuming a large amount of energy.

EMBODIMENTS

The details of the present invention will be explained with plural embodiments; however the present invention is not confined to these embodiments.

Embodiment 1, Example of Comparison 1

(Manufacturing of Activation Structural Body: Particles)

The particle Si in a globe shape 5-80 micrometers (Max 150 (micrometers)) was produced by gas atomizing method and the activation structural bodies (P1) were manufactured by arranging as shown in FIG. 1 (c) in a 300 cc Erlenmeyer flask.

Pouring 300 cc water (at 50 degree C.) into the Erlenmeyer flask, in which the activation structural bodies were manufactured, and leaving it in this temperature for an hour, the gas generation and the change of the quantity of dissolved oxygen were observed.

As an example for comparison, the particle of Si shown in FIG. 2 (b) was used (compared structural system (PC1)). The evaluation of gaseous generation was done with three categories such as; much generation as "**", generation as "*" and no generation as "X". The evaluation of quantity of dissolved oxygen was done with three categories as very much increasing in comparison to the quantities before processing as "**", slightly increasing as "*" and no change as "X". The result is shown in Table 3.

(Manufacturing of Planar Activation Structural Body)

Embodiment 2

After processing the anti electrostatic to the activation structural body (P1) obtained in the embodiment 1, the planar activation structure system (T1) was manufactured by sintering activation structural body with the conditions as shown in the following Table 2.

Example of Comparison 2

The compared structural system (TC2) was manufactured by sintering the compared structural system (PC1) obtained in the example of comparison 1.

Example of Comparison 3

A compared structural system (TC3) was manufactured by sintering the activation structural body (P1) obtained in the embodiment 1 with the similar conditions as the embodiment 2 but without anti electrostatic process. The compared activation structural body (TC2) has the similar range of the porosity to that of the activation structural body (T1) of the present invention and TC 3 has porosity more than 60%

The physical properties of the planar activation structural bodies manufactured in such process as described above are shown in the table 2 as below.

TABLE 2

| Manufacturing Conditions | Structural System (T1) | Structural System (TC2) | Structural System (TC3) |
|---|---|---|---|
| Sinter Temperature | 1300° C. | 1300° C. | 1300° C. |
| Sintering Time | 180 minutes | 180 minutes | 180 minutes |
| Sinter pressure | 25 MPa | 25 MPa | 25 MPa |
| Thickness (mm) | 0.5 | 0.5 | 0.5 |
| Length (mm) | 20 | 20 | 20 |
| Width (mm) | 0.5 | 0.5 | 0.5 |
| Porosity | 45-60% | 50-60% | 50-60% |
| Cross Sectional Shape | FIG. 4 (a) | FIG. 4 (b) | FIG. 4 (c) |
| Presence of Energy Concentrated Fields | presented | None | presented |

As have been clarified by the photos (FIG. 4 (a)-(b)), the activation structural body T1 has the energy concentrated fields but it is understood that the activation structural bodies TC1 and TC2 for comparison do not have enough energy concentrated fields.

In the next step, the activation structural body T1 manufactured by the above condition and the activation structure systems TC2 and TC3 were put in the water activation apparatus (of which volume was 300 cc) as shown in FIG. 8 (a) and the gas generation and the change of quantity of dissolved oxygen were observed. The evaluation of gaseous generation was done with three categories such as; much generation as "**", generation as "*" and no generation as "X". The evaluation of quantity of dissolved oxygen was done with three categories as very much increasing in comparison to the quantities before processing as "**", slightly increasing as "*" and no change as "X". The result is shown in Table 3.

TABLE 3

|  | P1 | PC1 | T1 | TC2 | TC3 |
|---|---|---|---|---|---|
| Gas Generation | * | X | ** | X | X |
| Quantity of dissolved oxygen | * | X | ** | X | X |

From the above results, it can be understood that the water activation was carried out only when the activation structural body (P1 and T1) was used due to the facts that the large volume of gases was generated and quantity of dissolved oxygen increased. However, no remarks were observed for the activation structural bodies used for the comparison.

The analytical results showed the inclusion of hydrogen, oxygen and nitrogen in the generated gases.

(Water Activation)

The water activation was performed by using the apparatus shown in FIG. 17. The activation structural body obtained in Embodiment 1 was placed around the flowing path of 8 mm diameter in an arrangement as shown in FIG. 17 (d) and distilled water was supplied in a flow rate of 0.5 meters per minute.

The ultra-violet spectra of the water before and after processing were shown in FIG. 21. FIG. 21 (a) shows the ultra-violet spectrum of the water (distilled water) before processing where no remarkable absorption bands are seen. On the other hand, a remarkable absorption band around 200 nm has been observed for the water after processing as shown in FIG. 21 (b) (FIG. 21 (c) superimposes the spectra shown in FIG. 21 (a) and (b) for comparing both absorption bands).

According to this result, it can be understood that the water activation is possible by using the activation structural body (the activation apparatus) of the present invention.

The implementations and embodiments of the present invention have been explained but the scope of the present invention is not only confined in those embodiments explained above. For example, the elements or the chemical components that compose the activation structural bodies are not specifically limited as far as the activation structural bodies have energy concentrated fields.

The invention claimed is:

1. A method for activating water, comprising:
    passing water through activation structural bodies formed to create energy concentrated fields, the activation structural bodies being formed by particles having a linear dimension in a range of 5 to 80 micrometers with distribution within a range of 30 micrometers between large particle and small particle, the particles being in substantially tetrahedral arrangement, and
    increasing a quantity of dissolved oxygen in said water concurrently, while carrying out the step of passing water through the energy concentrated fields,
    wherein said activation structural bodies are made of particles composed of silicon having at least 90% purity.

2. The method for activating water according to claim 1, wherein said activation structural bodies comprise particles having a shape generally of a globe.

3. The method for activating water according to claim 1, wherein said activation structural body is a particle bed.

4. The method for activating water according to claim 1, wherein said activation structural body is in a shape of a plate.

5. The method for activating water according to claim 4, wherein said plate has a thickness between 350 and 1500 micrometers.

6. The method for activating water according to claim 4, wherein said plate has a porosity in a range of 45% to 60%.

7. The method for activating water according to claim 4, including controlling height of surface level of the water with respect to the plates of activation structural bodies.

8. The method for activating water according to claim 4, including vibrating the plate.

9. The method for activating water according to claim 1, including heating said water.

10. The method for activating water according to claim 1, including circulating the water.

11. The method for activating water according to claim 1, including before the step of passing water through energy concentrated fields, there is the step of removing foreign materials from the water by one of being aggregated, precipitated or filtrated.

12. A method for activating water, comprising:
    providing activation structural bodies being formed by particles having a linear dimension in a range of 5 to 80 micrometers with distribution within a range of 30 micrometers between large particle and small particle, said particles being in substantially tetrahedral arrangement, the activation structural bodies having energy concentrated fields; and
    passing water or an aqueous media between at least two activation parts defined by the activation structural bodies,
    wherein said activation structural bodies are made of particles composed of silicon having at least 90% purity.

13. The method for activating water according to claim 12, including an activation unit having an inlet and an outlet, said unit also having an outer surface with said activation parts being formed on the outer surface.

* * * * *